(12) United States Patent
Masalha et al.

(10) Patent No.: US 12,476,788 B2
(45) Date of Patent: Nov. 18, 2025

(54) TOURNAMENT-LEAGUE MECHANISMS FOR COMPARISON BASED COMPUTER OPERATIONS

(71) Applicant: International Business Machines Corporation, Armonk, NY (US)

(72) Inventors: Ramy Masalha, Kafr Qari (IL); Allon Adir, Kiryat Tivon (IL); Ehud Aharoni, Kfar Saba (IL); Eyal Kushnir, Kfar Vradim (IL)

(73) Assignee: International Business Machines Corporation, Armonk, NY (US)

( * ) Notice: Subject to any disclaimer, the term of this patent is extended or adjusted under 35 U.S.C. 154(b) by 100 days.

(21) Appl. No.: 18/629,394

(22) Filed: Apr. 8, 2024

(65) Prior Publication Data
US 2025/0317273 A1    Oct. 9, 2025

(51) Int. Cl.
H04L 9/00    (2022.01)

(52) U.S. Cl.
CPC .................................. H04L 9/008 (2013.01)

(58) Field of Classification Search
CPC ..................................................... G06F 21/75
See application file for complete search history.

(56) References Cited

U.S. PATENT DOCUMENTS

| | | | |
|---|---|---|---|
| 7,941,649 B2 | 5/2011 | Selvaggi et al. | |
| 10,790,960 B2 * | 9/2020 | Williams | G06F 17/16 |
| 11,050,720 B2 * | 6/2021 | Soon-Shiong | H04L 63/08 |
| 11,277,256 B2 * | 3/2022 | Kim | H04L 9/008 |
| 11,277,257 B2 * | 3/2022 | Kim | H04L 9/008 |

(Continued)

FOREIGN PATENT DOCUMENTS

| | | |
|---|---|---|
| JP | 2020095437 A | 6/2020 |
| KR | 101769134 B1 | 8/2017 |

OTHER PUBLICATIONS

Cheon, Jung H. et al., "Numerical Method for Comparison on Homomorphically Encrypted Numbers", IACR, Asiacrypt 2019 Conference Paper, Nov. 22, 2019, 31 Pages.

(Continued)

*Primary Examiner* — Iral S Lakhia
(74) *Attorney, Agent, or Firm* — Cantor Colburn LLP; Anthony Mauricio Pallone

(57) ABSTRACT

Mechanisms are provided for performing a tournament-league comparison process of a computer function. A request is received to execute the computer function on a vector data structure, where a result of the computer function is provided by executing the tournament-league comparison process. The vector data structure comprises a plurality of values where each value corresponds to a vector slot. At least one iteration of a tournament comparison operation is executed to generate a first intermediate ciphertext and indicator matrix, where the first intermediate ciphertext comprises fewer vector slots than the at least one input vector data structure. A plurality of iterations of a league comparison operation are executed based on the first intermediate ciphertext and one or more second intermediate ciphertexts generated at each iteration of the league comparison operation. A final iteration of the league comparison operation is executed that outputs a final result of the tournament-league comparison process.

18 Claims, 13 Drawing Sheets

(56) References Cited

U.S. PATENT DOCUMENTS

| | | | | |
|---|---|---|---|---|
| 12,113,889 | B2* | 10/2024 | Moshkowich | G06F 21/00 |
| 12,170,718 | B2* | 12/2024 | Micciancio | H04L 9/008 |
| 12,395,516 | B1* | 8/2025 | Dalke | H04L 63/1408 |
| 2021/0376995 | A1* | 12/2021 | Ratha | H04L 9/0618 |
| 2021/0399874 | A1* | 12/2021 | Polyakov | H04L 9/085 |
| 2022/0085972 | A1 | 3/2022 | Jackson, II et al. | |
| 2024/0195618 | A1* | 6/2024 | Paul | H04L 9/14 |
| 2024/0313944 | A1* | 9/2024 | Choi | H04L 9/008 |
| 2024/0364496 | A1* | 10/2024 | Chevallier-Mames | H04L 9/008 |
| 2025/0086437 | A1* | 3/2025 | Liu | G06N 3/0464 |
| 2025/0150258 | A1* | 5/2025 | Pradhan | H04L 9/0869 |
| 2025/0165967 | A1* | 5/2025 | Ku | H04L 9/0618 |
| 2025/0192983 | A1* | 6/2025 | Boehler | H04L 9/0618 |

OTHER PUBLICATIONS

Crawford, Jack L. et al., "Doing Real Work with FHE: The Case of Logistic Regression", Cryptology ePrint Archive, Paper 2018/202, Feb. 19, 2018, 29 Pages.

Garcelon, Evrard et al., "Encrypted Linear Contextual Bandit", Proceedings of the 25th International Conference on Artificial Intelligence and Statistics (AISTATS), Valencia, Spain. PMLR: vol. 151, Mar. 28-30, 2022, 33 Pages.

Iliashenko, Illia et al., "Faster homomorphic comparison operations for BGV and BFV", IACR Cryptology, Apr. 27, 2021, 33 Pages.

Lee, Hyunjun et al., "Approximating Max Function in Fully Homomorphic Encryption", Electronics 2023, 12, 1724. Apr. 4, 2023, 8 Pages.

Masalha, Ramy, "Tournament Type Selection Operations on Encrypted Data", US Pending U.S. Appl. No. 17/992,597, filed Nov. 22, 2022, 54 Pages.

Sebert, Arnaud G. et al., "SPEED: Secure, Private and Efficient Deep Learning" Machine Learning, vol. 110, Mar. 2021, pp. 675-694, arXiv:2006.09475v2 [cs.CR], Mar. 26, 2021, 32 Pages.

Sèbert, Arnaud G. et al., "When approximate design for fast homomorphic computation provides differential privacy guarantees", Cryptology and Security, arXiv:2304.02959v1 [cs.CR], Apr. 6, 2023, 28 Pages.

Slotin, Sergey, "Argmin with SIMD", Algorithmica, Jul. 2022, 9 Pages.

Zuber, Martin et al., "Efficient and Accurate homomorphic comparisons", CEA-List, 91190 Gif-sur-Yvette, May 20, 2022, 24 Pages.

* cited by examiner $$A \quad \vee \quad A^T$$

CIPHERTEXT C1 | CIPHERTEXT C2

| 5 | 5 | 5 | 5 |
|---|---|---|---|
| 3 | 3 | 3 | 3 |
| 10 | 10 | 10 | 10 |
| 2 | 2 | 2 | 2 |

A:
| 5 | 5 | 5 | 5 |
| 3 | 3 | 3 | 3 |
| 10 | 10 | 10 | 10 |
| 2 | 2 | 2 | 2 |

INDICATOR MATRIX 210

| 1 | 1 | 1 | 0 |
|---|---|---|---|
| 0 | 0 | 1 | 0 |
| 1 | 1 | 1 | 0 |
| 0 | 0 | 0 | 0 |

*FIG. 2A*

$$A_1 \quad\quad A_1^T$$

$$A_2 \quad\quad A_2^T$$

FIG. 4A $$A_1^T = \begin{bmatrix} 5 & 3 & 10 & 2 \\ 5 & 3 & 10 & 2 \\ 5 & 3 & 10 & 2 \\ 5 & 3 & 10 & 2 \end{bmatrix}$$

$$A_2^T = \begin{bmatrix} 12 & 4 & 1 & 7 \\ 12 & 4 & 1 & 7 \\ 12 & 4 & 1 & 7 \\ 12 & 4 & 1 & 7 \end{bmatrix}$$

$$A_{combined}^T = \begin{bmatrix} x & 3 & 10 & 2 \\ 12 & x & 10 & 2 \\ 12 & 4 & x & 2 \\ 12 & 4 & 4 & x \end{bmatrix}$$

*FIG. 4C*

$$A_{combined} \lor A^T_{combined}$$

$inputVals = \{5, 3, 10, 2, 12, 4, 1, 7\}$ $C$

| | | | |
|---|---|---|---|
| x | (5>3) | (5>10) | (5>2) |
| (4>12) | x | (3>10) | (3>2) |
| (1>12) | (1>4) | x | (10>2) |
| (7>12) | (7>4) | (7>1) | x |

$argmax_0 = C_{0,1} * C_{0,2} * C_{0,3}$ $argmax_1 = (1 - C_{0,1}) * C_{1,2} * C_{1,3}$ $argmax_2 = (1 - C_{0,2}) * (1 - C_{1,2}) * C_{2,3}$ $argmax_3 = (1 - C_{0,3}) * (1 - C_{1,3}) * (1 - C_{2,3})$

*FIG. 5A*

TOURNAMENT-LEAGUE MECHANISMS FOR COMPARISON BASED COMPUTER OPERATIONS

BACKGROUND

The present application relates generally to an improved data processing apparatus and method and more specifically to an improved computing tool and improved computing tool operations/functionality for performing improved tournament-league mechanisms for comparison based computer operations, such as in fully homomorphic encryption operations.

Fully homomorphic encryption (FHE) is an encryption scheme that enables analytical functions to be run directly on encrypted data, also referred to as ciphertext, while yielding results from the encrypted data that are the same as if the analytical functions were executed on the unencrypted data, also referred to as the plaintext. Such encryption schemes are attractive in cloud-based computing environments as it allows data providers to encrypt their data, and thereby maintain the privacy or secrecy of the data, before providing the encrypted data to cloud services that execute analytical functions on the encrypted data, train machine learning computer models using the encrypted data as training and testing datasets, execute machine learning computer models on the encrypted data, or the like, generate results that are returned to the data providers. This allows data providers to leverage the computational capabilities and services of cloud-based computing environments without exposing their private data to other parties.

For example, a data provider, e.g., a hospital, medical insurance company, financial institution, government agency, or the like, may maintain a database of data comprising private data about patients that the data provider does not want exposed outside of its own computing environment. However, the data provider, for various reasons, wishes to utilize the analytical capabilities, machine learning computer models, or the like, of one or more cloud-based computing systems to perform analytical functions, artificial intelligence operations, such as generating insights from classifications/predictions performed by trained machine learning computer models, or the like, on the private data. For example, if the data provider is a hospital and wishes to perform analytics on its patient data, the hospital would like to send the patient data to the cloud-based computing systems for performance of these analytics, which may use specially trained machine learning algorithms and the like. However, the hospital does not want to expose the personally identifiable information (PII) of the patients, e.g., names, addresses, social security numbers, or other types of information that alone or in combination can uniquely identify an individual, as such exposure would not only open the hospital to legal liability, but may also be in violation of established laws of the jurisdiction(s) in which the hospital operates.

As a result, using FHE, the hospital may encrypt the data prior to sending the encrypted data to the cloud-based computing system for performance of the analytics functions. The analytics are executed on the encrypted data and the encrypted results are returned. The data provider then unencrypts the encrypted results and obtains the unencrypted results for use by the hospital. At no time in this process does the cloud-based computing system gain access to the unencrypted data and thus, privacy is preserved. Thus, FHE allows analytical functions to be performed on private data without divulging the private data itself, and without the need for trusted third parties or intermediaries, and without having to mask or drop features in order to preserve privacy of the data, e.g., through replacement of PII with generic privacy preserving representations of the PII, or other modifications or replacements of private data.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for performing a tournament-league comparison process of a computer function. The method comprises receiving a request to execute the computer function on at least one input vector data structure, where a result of the computer function is provided by executing the tournament-league comparison process. The method further comprises receiving the at least one input vector data structure comprises a plurality of values, each value corresponding to a vector slot of the at least one input vector data structure. In addition, the method comprises executing at least one iteration of a tournament comparison operation to generate a first intermediate ciphertext and indicator matrix, where the first intermediate ciphertext comprises fewer vector slots than the at least one input vector data structure. Furthermore, the method comprises executing a plurality of iterations of a league comparison operation based on the first intermediate ciphertext and one or more second intermediate ciphertexts generated at each iteration of the league comparison operation. In addition, the method comprises executing a final iteration of the league comparison operation that outputs a final result of the tournament-league comparison process, and performing the requested computer function based on the result of the tournament-league comparison process.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIGS. 2A and 2B are example diagrams illustrating a league method for determining an argmax function result;

FIGS. 4A-4D are example diagrams illustrating a process of using upper and lower portions of ciphertexts in a single ciphertext for performing league rounds in accordance with one illustrative embodiment;

FIGS. 5A and 5B are example diagrams illustrating two example options for extracting an output of a comparison based compute operation based on the combined upper/lower triangle ciphertext in accordance with one illustrative embodiment;

DETAILED DESCRIPTION

Figure 1:
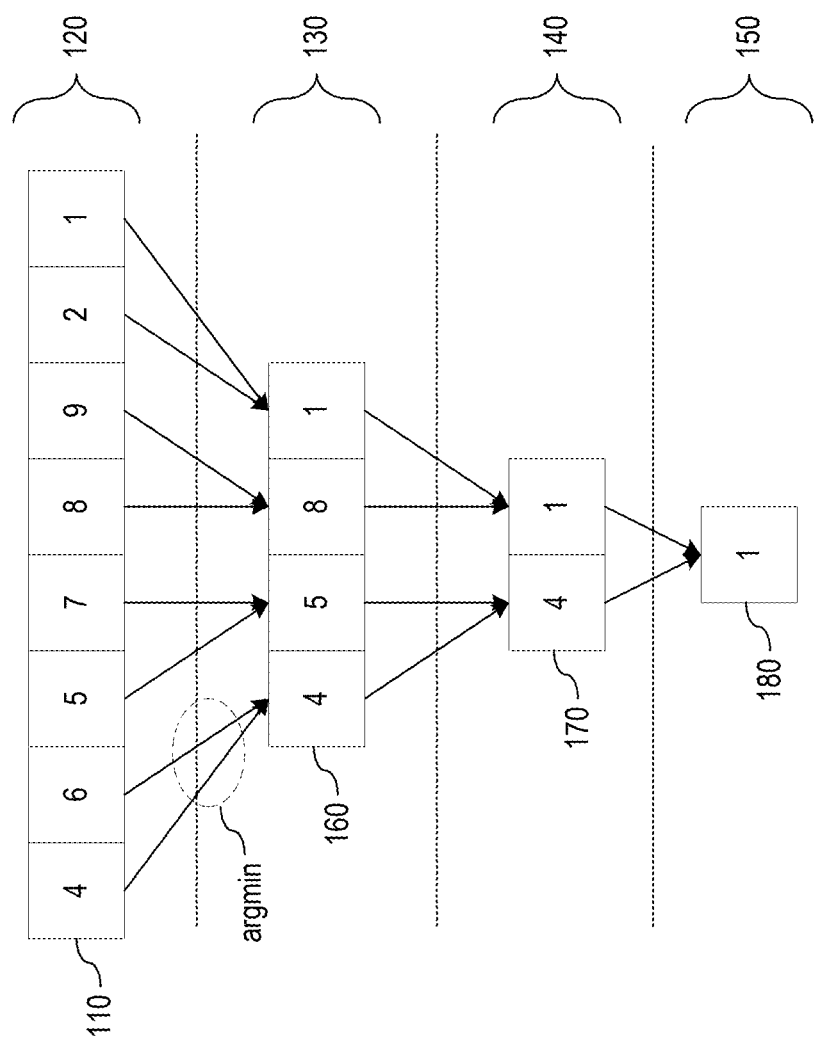
FIG. 1 is an example diagram illustrating a tournament type selection operation where local selection is performed over multiple iterations or rounds in order to ultimately generate a global selection.

As mentioned above, fully homomorphic encryption (FHE) is a promising solution to enable privacy preserving machine learning in cloud computing environments. Many computer operations involving FHE data utilize functions involving numerous comparisons, which are, in terms of computer performance, costly to implement as it is a time consuming process, slowing down other computer operations that are dependent upon the results of such operations. By reducing the number of comparison operations required to perform such functions, the speed of the overall operation of the computing system may be improved. It should be appreciated that while FHE operations will be used in the description of the illustrative embodiments, the illustrative embodiments are not limited to such and the mechanisms of the illustrative embodiments may be implemented with regard to any comparison based computer operations in which relatively large numbers of values are compared, potentially in a plurality of rounds of comparisons, to generate the result of the computer operation.

The maximum, argmax, minimum, and argmin functions are examples of functions that require comparisons between data values to generate the result of these functions. The maximum and minimum functions operate on a dataset to determine the maximum and minimum values in the dataset, which requires comparing each value to each other value. Argmax is an operation that finds the value of the argument(s) of a function that gives the maximum value from the target function. Argmin, likewise, is an operation that finds the value of the argument(s) that gives the minimum value from the target function. Argmax may be used, for example, in machine learning operations for finding the class with the largest predicted probability. Similarly, argmin may be used, for example, in machine learning operations for finding the class with the least predicted probability. Such functions may be used in FHE compute operations on input ciphertexts to generate results of these FHE compute operations without exposing the private data.

These functions, and others, utilize comparisons to determine the final result of the function. The comparisons may be performed in various ways. One way that such comparisons are performed is to use a tournament type process to select an element from a set of elements, e.g., selecting a vector slot value corresponding to a class of the machine learning operation from a set of vector slot values. As examples, applications of a tournament type processes for performing a computer operation include the argmax or argmin functions of an ordered set, where these functions select the maximum or minimum values from the ordered set, respectively. Another example operation may be the probabilistic selection of a fittest candidate from among a set of candidates, such as may be performed in genetic algorithms and the like.

FHE algorithms pack multiple values, or candidates, into a single ciphertext, where each value/candidate is represented as a slot in the ciphertext vector. This allows for single instruction multiple data (SIMD) operations to be performed on the ciphertext slots. Utilizing SIMD operations helps to reduce the number of operations and the number of ciphertexts, which in turn reduces the latency and memory consumption of programs implementing such FHE algorithms. In particular it is useful to utilize SIMD operations to implement tournament type selection operations.

FIG. 1 is an example diagram illustrating a tournament type selection operation, such as those that may be used in functions such as argmin, argmax, or any other suitable function where local selection is performed over multiple iterations or rounds in order to ultimately generate a global selection. In the example shown in FIG. 1, an argmin operation is depicted, however it should be appreciated that this is only an example and other similar tournament type selection operations may be performed with other functions or operations, such as argmax, prediction operations (often used in machine learning operations) such as maxpooling, K-nearest neighbor, operations for selecting optimum candidates from a set of candidates, e.g., maximum accuracy/lowest error in machine learning training operations, or the like. As one specific implementation, such tournament type selection processes may be implemented in genetic algorithms that select between a plurality of candidates represented as slots in a ciphertext to determine a fittest candidate.

The tournament type selection process shown in FIG. 1 is an example performed with regard to an input ciphertext 110, where the tournament type selection process is specifically part of an argmin operation based analytic that finds the minimum ciphertext value or slot within the given input ciphertext 110. Each level 120-150 represents the results of an iteration or round of the tournament type selection operation in which local selections are performed, and with the combination of levels 120-150 together representing the overall function, e.g., argmin, or tournament type selection process, level 150 providing the final global result of the function or selection process.

As shown in FIG. 1 the input ciphertext 110 has a plurality of slots, which for ease of explanation have the depicted values, however it should be appreciated that these ciphertext slots may have more complex values of various formats depending on the particular implementation, such as real numbers (e.g., 0.2, 0.3333, 5.4) or complex numbers (e.g., 1+3i, 0.5−3i), or the like. In the depicted example, which is simplified for ease of explanation but may have many more slots and more complex values than those shown, the input ciphertext 110 has values [4, 6, 5, 7, 8, 9, 2, 1]. In a first round or iteration of the argmin operation, the minimum between each sequential pairing of slots is determined to generate a first intermediate result 160. That is the first two slots compare the values of 4 and 6 with the minimum value being selected for inclusion in the first intermediate result 160, e.g., 4 in this case. The same process is performed for the third and fourth slots, the fifth and sixth slots, and the seventh and eighth slots, e.g., local argmin operations of argmin [4,6], argmin [5, 7], argmin [8,9], and argmin [2,1], to generate intermediate result 160 comprising values [4,5, 8,1].

In a next round or iteration, the intermediate result 160 is operated on to again determine the local argmin between the first two slots and the last two slots, e.g., argmin [4, 5] and argmin [8, 1], to generate the second intermediate result 170 having values [4, 1]. This process is then performed again with a next round or iteration that generates the final result 180 of [1]. Thus, the value [1] is the minimum value in the original input ciphertext 110. This process is referred to as a tournament type process as the process mirrors a sports tournament in which teams are paired against each other and the "winners" go on to play one of the "winners" from a previous round of the tournament.

FHE algorithms utilize such tournament type processes between ciphertexts rather than within the same ciphertext. That is, while FIG. 1 shows a tournament type process being performed between slots of a single ciphertext, FHE algorithms may operate to perform tournament type selections between two different ciphertexts, e.g., a first ciphertext [4, 6, 5, 7] and a second ciphertext [6, 5, 7, 4] with a result of an argmin operation being [4, 5, 5, 4] in this case. Performing a tournament type process within a single ciphertext is a non-trivial operation because it requires costly rotation operations being performed on the ciphertext slots to accomplish what is shown in FIG. 1.

With regard to the argmax function, as an example, the tournament type process computes argmax $(x_1, \ldots, x_n)$ using log(n) rounds of comparisons such that half of the remaining values are "eliminated" in each round. After log(n) rounds, the single remaining value is the maximum value. The same is true of the argmin function which uses log(n) rounds of comparisons and after log(n) rounds, the single remaining value is the minimum value (see FIG. 1 above). For purposes of the following description, the argmax function will be used as an example of a comparison based FHE operation, but it should be appreciated that the considerations and mechanisms of the illustrative embodiments apply to other comparison based FHE operations including argmin, maximum, minimum, and the like.

Thus, the tournament type process for implementing the argmax function requires log(n) comparisons to find the maximum among n values, e.g., 32K values. As will be described in greater detail hereafter, the illustrative embodiments provide an improved computing tool and improved computing tool operations/functionality that are specifically directed to improving the way in which such comparison based FHE operations are performed by significantly reducing the number of needed comparisons. This results in a performance increase as the amount of processing time and resources required to accomplish the FHE operation and generate results is reduced.

Figure 2B:
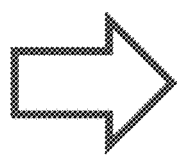

Another method that may be used to perform such comparison based FHE operations is referred to as the "league" method. FIGS. 2A and 2B are example diagrams illustrating a league method for determining an argmax function result. This method computes argmax $(x_1, \ldots, x_n)$ by computing all possible pairs of comparisons $(x_i > x_j)$. Then, the i-th value of the argmax result can be represented as: $(x_i > x_1)^* \ldots *(x_i > x_n)$. Assuming an FHE scheme that uses $s >= n^2$ slots, then each $x_i$ may be duplicated n times inside one ciphertext, thus obtaining a ciphertext having the following values: $C1 = \{x_1, x_1, \ldots, x_1, x_2, \ldots, x_2, \ldots, x_n, \ldots, x_n\}$, where each $x_i$ is duplicated n times. Next, using rotations and masking one can obtain the following ciphertext: $C2 = \{x_1, x_2, \ldots, x_n, x_1, x_2, \ldots, x_n, \ldots, x_1, x_2, \ldots, x_n\}$, where the block $\{x_1, x_2, \ldots, x_n\}$ is duplicated n times.

An example of C1 and C2 is shown in FIG. 2A as the matrix A and its transpose $A^T$. As shown in FIG. 2A, the first ciphertext C1, or A, comprises the original ciphertext values $\{5, 3, 10, 2\}$ duplicated along the rows in this simplified 4×4 matrix. Similarly, the second ciphertext C2, or $A^T$, comprises the duplicated values in each column. It should be appreciated that while the example shows the second ciphertext C2 to be the transpose of the first ciphertext C1, in other implementations, the two ciphertexts need not be representations of the same original ciphertext $\{5, 3, 10, 2\}$ and instead may be two completely separate ciphertexts. Moreover, it should be appreciated that references to the "matrix" or "matrices" herein are referring to the matrix based representation of the ciphertext values, or slots, in the ciphertext vector data structure, e.g., $\{5, 3, 10, 2\}$ may be represented as a vector of values and that vector of values may be represented as a matrix.

As shown in FIG. 2A, the ciphertext slots may be used to represent matrices. For example, a matrix of 4×4 values may be represented by 16 slots of a ciphertext, where the first row is represented by the slots of indexes 0 until 3, the second row is represented by the slots 4 until 7, etc. More generally, a matrix of n×m may be represented by n*m slots of a ciphertext, where the first n consecutive slots represent the first row, the second n consecutive slots represent the second row and so on. It should be noted that the illustrative embodiments are not limited to this specific representation method of a matrix by a ciphertext, as it supports any other representation method desirable for the particular implementation. Using such a representation method, operations over matrices are mapped to rotation and multiplication operations over ciphertexts. For example, given a matrix of 4×4 represented by 16 consecutive slots of a ciphertext, the ciphertext may be multiplied by a plaintext vector of $\{1, 1, 1, 1, 0, \ldots, 0\}$ to zero all elements aside from the first row. Then, the resulting product ciphertext may be rotated four elements to the right to move the first row of the represented matrix to become the second row. By compounding such multiplications and rotations, more complex operations on matrices, such as transpose, for example, are possible to implement.

As shown in FIG. 2A, having obtained the two ciphertexts C1 and C2, the league methodology may proceed by computing compRes=isGreater (C1, C2), which utilizes the $s >= n^2$ slots to perform comparisons between all $n^2$ pairs of values. The function IsGreater (C1, C2) is a function that returns an encryption of 1 if C1 is greater than C2, and 0 otherwise. In the examples a condition of "is greater or equal" is actually used in that a small value eps>0 is added to the main diagonal of C1 and then the comparison IsGreater (C1+eps, C2) may be evaluated. This ensures that the operation gets 1 for the equal values. The "isGreater" operation may be implemented in FHE using a polynomial approximation. The "compRes" value is a variable that stores the result of "isGreater".

The comparison may be performed on each of the pairs of values all at once, such as by using single instruction multiple data (SIMD) operations, to obtain an indicator matrix 210 in which 1 values indicate that the value in a matrix location of C1 is equal to or greater than a corresponding value in a corresponding matrix location of C2, and a 0 value indicates that the value in the matrix location of C1 is not equal to or greater than the value in the corresponding matrix location of C2.

Finally, the argmax result may be obtained by multiplying each consecutive n slots of the "compRes" ciphertext, i.e., multiplying columns as shown in FIG. 2B. For example, as shown in FIG. 2B, multiplying each consecutive slot of row 1 results in the value 0 across the row because the matrix value 220 is 0. That is, if any matrix location in a row contains a 0 value, the values for the row will all be 0 after the multiplication. Thus, the value in a matrix location at index n*i will contain 1 if $x_i$ is the maximum, and 0 otherwise. For example, as shown in FIG. 2B, the values in the cells of the row corresponding to the value 10 are set to 1 because it is the maximum value.

It should be appreciated that in the examples described herein, the following definitions of the referenced values are utilized:

n: number of values on which to perform the operation (e.g., argmax, argmin, etc.);

s: number of slots in the ciphertext (determined by the FHE configuration);

$x_1, x_2, \ldots, x_n$: the input values on which to perform the operation (e.g., argmax, argmin, etc.);

$m_1, m_2, \ldots$, etc.: these are intermediate values, e.g., the result obtained after performing two tournament rounds;

$y_1, y_2, \ldots$, etc.: these are also intermediate values, e.g., the result obtained after performing two tournament rounds and one league round;

i: an index used to specify the current league round (i=1 for the first round, i=2 for the second round, etc.);

K (capital K): this is a constant value, such as 1024 (or 2^10);

k (small k): this is equal to log(n).

The league round on n values requires $n^2$ comparisons. If $n^2$ is less than the number of slots s, or slotCount, then this operation can be performed with one SIMD comparison operation all at once. However, the drawback of the league method is that if $n^2$ is greater than the number of slots s, or slotCount, then one needs many comparisons to find the argmax (or argmin). For example, if n=S, then one needs S comparisons. Given that S is usually large (e.g., 32K), this number of comparisons is not practically implemented as it requires a relatively large amount of time to perform all these comparisons and results in a performance degradation in computer functionality.

Another method for performing comparison based function computations, such as argmax/argmin, combines the tournament and league methods discussed above. This method relies on performing tournament rounds until reaching sqrt(s) values, and then performing one league round to find the argmax of sqrt(S) values. For example, assuming that an operation involves computing the argmax of $32K=2^{15}$ values with a configuration supporting $S=2^{15}$ slots, then the following steps are performed:

1. Use tournament rounds to reduce the number of values from $2^{15}$ to $2^{14}$, then to $2^{13}$, $2^{12}$ and so on up to $2^7=128$ (sqrt (32K)=178 and thus, 128 is smaller than 178). This generates an indicator vector for step dl (an indicator vector is one that stores values of 1 for a target subset T of a larger set S, e.g., those in which a condition is satisfied, and a 0 for elements not in T, e.g., indicating the condition is not satisfied, for example).

2. Use one league round to find the argmax of the remaining $2^7$ (128) values (Step 2 is possible with one comparison since $128^2<s$). This generates an indicator vector for step 2.

3. Multiply the indicator vector of step 1 with the indicator vector of step 2 to obtain the final argmax result.

Assuming $n=s=2^k$, this combined tournament-league method requires approximately (k/2)+1=log(n)/2+1 SIMD comparison rounds, which is twice better than the tournament method alone. This is still quite a large number of comparisons, however, which greatly impacts the performance of computer operations, especially in the case of FHE operations which operate on ciphertexts. That is, in FHE computations, comparisons represent a significant bottleneck of the maximum, minimum, argmax, argmin, and similar functions. It should be appreciated that while the illustrative embodiments may be especially useful for FHE computations, the illustrative embodiments are not limited to such and the mechanisms of the illustrative embodiments are applicable to any computations and context in which such comparisons may be improved using the mechanisms of the illustrative embodiments.

The illustrative embodiments of the present invention reduce the number of comparisons needed to perform a comparison based computation or function using a combined tournament-league methodology. For example, one or more of the illustrative embodiments operate to reduce the number of needed comparisons to O(log(k))=O(log (log(n))). Thus, where the tournament-league method above requires log(n)/2+1 SIMD comparison rounds, the mechanisms of the illustrative embodiments require log (log(n)) SIMD comparison rounds (where log is a log in base 2).

The illustrative embodiments provide an improved computing tool and improved computing tool operations/functionality for performing comparison based computation operations, such as a FHE computation involving maximum, minimum, argmax, argmin, or the like. The improved computing tool and improved computing tool operations/functionality implement an improved combination of league and tournament methods of performing such comparison based computations, where the improved combination utilizes the fact that after each round of comparisons, there are fewer remaining values and thus, more redundant slots. The illustrative embodiments, after an initial relatively small number of tournament rounds of comparisons, duplicates the tournament round results and then divides the values of the ciphertexts, e.g., matrices, into blocks and performs a league based computation on each block separately. Different league sizes are used at each league round according to the number of duplicate slots resulting from the previous round. For example, in some illustrative embodiments, at each league round, the league size is set to the maximal possible league size depending on the number of redundant slots in the ciphertext (matrix).

For example, in some illustrative embodiments, a predetermined number of tournament method based comparison rounds are performed in order to reduce the number of values being considered in the comparison based computation. The following description assumes an argmax operation is being performed and thus, in accordance with some illustrative embodiments, two tournament rounds may be performed to start in order to reduce the number of values under consideration for league rounds to n/4, where n is the number of values in the input ciphertext. The tournament round results are duplicated among each block of 4 slots:

{m1, m1, m1, m1, m2, m2, m2, m2, ... }. This is because after two tournament rounds, there are s/4 remaining values and only s slots in the ciphertext, so there is only enough space for duplicating each value 4 times.

It should be appreciated that while two rounds of the tournament comparisons are used in the description of the illustrative embodiments, the illustrative embodiments are not limited to such and other numbers of rounds are possible. However, using another number of rounds may be less optimal. For example, one round is less than the optimal number of rounds, because after one tournament round, each value of the tournament result will be duplicated just twice (because there are s values to start, s/2 values remained after the tournament and there are only s slots in the ciphertext, which allows duplicating each value up to two times). This means that the maximum league size that can be used after one tournament round is a league of size 2 (i.e., matrices of size 2×2). Leagues of size 2 would reduce the number of remaining values 2 times, which is the same result obtained if another tournament round is applied. Because a league round involves additional operations compared to a tournament round (e.g., rotations and multiplications by plaintext vectors), it is preferred to apply a tournament round instead of a league round if they both have a similar effect on the remaining number of values.

After performing two tournament rounds, however, it is better to do a league round instead of doing more tournament rounds. The reason is that the two tournament rounds reduce the number of values to s/4, meaning that a league of size 4 may be applied. Applying a league of size 4 will reduce the number of remaining values 4 times, which is better than applying a tournament round that reduces the remaining values only 2 times.

After the two tournament rounds, league rounds are performed on each block of slots in the ciphertext (matrix), with each subsequent league round having the league size set to the maximal possible league size depending on the number of redundant slots. For example, the league size may be set to $2^{2^i}$ where i is an integer value corresponding to the league round, e.g., 1, 2, 3, etc. Thus, for example, in a first league round, the league size may be 4×4, in a second league round, the league size may be 16×16, in a third league round, the league size may be 256×256, etc. It should be appreciated that this is only one example, and other implementations may utilize different ways for varying the league size at each league round without departing from the spirit and scope of the present invention.

This process may be repeated with subsequent league rounds until the league size is equal to or less than the slotCount, i.e., the value of S, which is the number of slots of the ciphertexts. The slotCount value is determined by the particular configuration scheme used. Examples of commonly used slotCount values are $2^{14}$ or $2^{15}$. As a result of this improved tournament-league operation, if one considers the situation where n is less than or equal to the slotCount, this improved tournament-league approach requires only log(log(n)) comparison rounds (tournament rounds and league rounds). While there may be additional performance costs for rotation operations inside the league rounds due to the need to generate the transpose of the input matrix (ciphertext), these rotations are not considered to introduce any significant costs when one considers these operations being performed by graphics processing units (GPUs) or the like.

Thus, for example, if one assumes that slotCount=32K, after two tournament rounds, the number of values is reduced to 8K (32K/4). Applying a first league round using a 4×4 league size, the number of values may be reduced down to 2K values. Applying a second league round using a 16×16 league size, the number of values is reduced to 2K/16=128 values. In a third league round using a 128×128 league size, the number of values is reduced to one. This results in 5 comparison rounds in total needed for the improved tournament-league approach provided by the illustrative embodiments. In comparison, the tournament-league approach previously described would require 8 comparison rounds in total, e.g., 7 tournament rounds (32K to 16K to 8K to 2K to 1K to 512 to 256 to 128 values) and one league round (128 values to 1 value). This can reduce the amount of processing time required to complete the comparison based operation from approximately 11 seconds for the previously described tournament-league approach, to only approximate 7 seconds for the improved tournament-league approach of the illustrative embodiments. There is a greater savings in processing time over the tournament alone approach, which requires approximately 17 seconds to complete.

In some illustrative embodiments, the improved computing tool and improved computing tool operations/functionality may be further improved by reducing the number of comparisons required even further. In these other illustrative embodiments, instead of performing $n^2$ comparisons in the league rounds of the improved tournament-league approach to thereby compare all pairs of values, it can suffice to perform comparisons of the kind $a_i > a_j$ where i>j, i.e., each pair of values is compared only once, which requires $n*(n-1)/2$ comparisons rather than the $n^2$ comparisons in each round. This may reduce the number of comparison rounds from the 5 comparisons mentioned above, to only 4 comparisons with this additionally improved illustrative embodiment.

In this additionally improved illustrative embodiment, one tournament round is applied to the input ciphertext, e.g., 32K values, to thereby reduce the number of values in half to 32K/2-16K values. Each block of 10 slots holds 5 values due to the duplication performed as part of the tournament round. The 10 slots are enough to perform all of the required comparisons on a block of 5 values since 5*4/2=10, i.e., inserting "5" into the formula n*(n-1)/2. This leaves 16K/5 which is approximately 3279 values. At this point, each value is duplicated 10 times, since after applying a league of size 5 (matrices of 5×5), the number of duplications increase 5 times, and the operation looks for the maximal n such that $n*(n-1)/2 <= n*10$. In this particular example, the maximal n is 21, i.e., n=21 -> 21*(21-1)/2=21*10. The reasoning behind this formula is that to apply a league on n values, at least n*(n-1)/2 comparisons are to be used, which requires at least n*(n-1)/2 slots. However, since each value is duplicated along 10 slots, the number of slots that can be used for n values is 10*n. To make sure that the slots required for the league fit in the slots that contain the n values, it is required that $n*(n-1)/2 <= n*10$. The operation looks for the maximal n that satisfies this inequality because it is desirable to use league rounds with as large a league size as possible, as this will reduce the needed number of comparison rounds.

Now, each of the 210 slots holds 21 values. Since 21 values require 21*20/2=210 comparisons, the league round can be performed on the 21 values, leaving 3279/21, or approximately 157 values. Thereafter, the final league round can be performed on these 157 values to compute the argmax (or argmin). This requires 157*156/2=12246 comparisons, which fits into the 32K slot ciphertext. As a result, a total of only 4 comparison rounds (1 tournament round and 3 league rounds) are needed. This improves upon the previous improved tournament-league approach which uses 5 rounds and is twice as much better than the 8 round previously described tournament-league method.

One possible implementation of this approach in some illustrative embodiments is to combine two league round comparisons into one matrix using upper and lower triangles of the matrix. The upper triangle diagonal (excluding the main diagonal) may be used to perform the first league round comparison, and the lower triangle may be used to perform the second league round comparison, for example. This improvement to performing the league round comparisons will be described in greater detail with reference to the figures hereafter.

Thus, the illustrative embodiments described herein provide an improved computing tool and improved computing tool operations/functionality to provide tournament-league type comparison processes that significantly reduces the number of comparison rounds required to accomplish a comparison based compute operation, such as argmax, argmin, maximum, minimum, or the like. The illustrative embodiments provide a tournament-league type comparison process in which a relatively small number of tournament rounds of comparisons are initially performed with a relatively larger number of league rounds of comparisons, e.g., 2 tournament rounds and 3 league rounds (total of 5 rounds), or 1 tournament round and 3 league rounds (total of 4 rounds), in the example illustrative embodiments. Thus, the illustrative embodiments are more efficient with regard to the minimized number of comparison rounds required in the tournament-league type comparison process for performing comparison based compute operations. The improved computing tool functionality provided by the illustrative embodiments facilitates intra-ciphertext tournament-league type comparison based functions to be performed between slots of the same ciphertext or different ciphertexts. This in turn improves operations that rely on such ciphertexts including fully homomorphic encryption (FHE) based algorithms, which may include machine learning operations, genetic algorithms, and the like.

It should be appreciated that while the illustrative embodiments are described herein with regard to ciphertexts and the use of ciphertexts with fully homomorphic encryption (FHE), the illustrative embodiments are not limited to such. Rather, the illustrative embodiments may be implemented with regard to any computer operations in which multiple rounds or iterations of local selections are performed in order to ultimately generate a global selection, i.e., a tournament-league type comparison and selection process, whether the data is a ciphertext or plaintext. For example, the illustrative embodiments may operate to improve such tournament-league type selection processes with regard to any vector inputs where the comparison and selection is between slots of one or more vectors. Thus, while the illustrative embodiments will be described with regard to slots of an input ciphertext, the illustrative embodiments are not limited to such and other vectors, or sets of data values, may be used without departing from the spirit and scope of the present invention.

With this in mind, with regard to the illustrative embodiments operating on a ciphertext input, it is assumed that an input ciphertext, represented as a vector of values where each value is an encrypted value, is received and is the basis for the selection process. That is, the processor of a computing device receives, from memory, data storage, or the like, a data structure that is the input ciphertext for performance of an operation on that ciphertext as part of an overall computer algorithm, such as a machine learning algorithm, genetic analysis algorithm, or the like. The computer operation may be, for example, an argmax, argmin, max, min, or other computer function/operation that relies on a comparison based compute operation in which values satisfying criteria of the function/operation are selected at each round of comparisons, e.g., such as in a tournament-league type selection process.

Of particular note, the illustrative embodiments are especially well suited to operations involving ciphertexts, such as in the case of fully homomorphic encryption (FHE) enabled operations, e.g., machine learning, knowledge graph embedding, or a variety of other operations where privacy of the features in the data is to be maintained, e.g., labels and other features, of the entities and predicates (relationships or links) in the graph embeddings, features used for performing machine learning, and the like. The tournament-league type comparison/selection process facilitates more complex computer operations, such as expanding the knowledge graph, evaluating queries based on the knowledge graph, such as predicting a likelihood that two entities have a relation specified in the query, or the like. These operations may also include operations such as performing machine learning model based classification, prediction, or the like, training such machine learning models, and the like. In general, any homomorphic encryption (HE) functionality based analytics, such as HE layers of a machine learning computer model, that involve the execution of tournament-league type comparison/selection processes will be improved by the improved computing tool functionalities of the illustrative embodiments.

Before continuing the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular technological implementation for accomplishing and/or performing the actions, steps, processes, etc., attributable to and/or performed by the engine, but is limited in that the "engine" is implemented in computer technology and its actions, steps, processes, etc. are not performed as mental processes or performed through manual effort, even if the engine may work in conjunction with manual input or may provide output intended for manual or mental consumption. The engine is implemented as one or more of software executing on hardware, dedicated hardware, and/or firmware, or any combination thereof, that is specifically configured to perform the specified functions. The hardware may include, but is not limited to, use of a processor in combination with appropriate software loaded or stored in a machine readable memory and executed by the processor to thereby specifically configure the processor for a specialized purpose that comprises one or more of the functions of one or more embodiments of the present invention. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

It should be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

As noted above, the illustrative embodiments provide an improvement to the specific way in which computers perform tournament-league type comparison/selection processes as part of computer operations such as argmax, max, argmin, min, and other computer processes that involve a tournament-league type comparison/selection. The improvement may be implemented as a dedicated hardware component of a processor, a set of software instructions loaded into memory and executed by the processor, or any combination of dedicated hardware and/or instructions loaded into memory and executed by the processor. The illustrative embodiments provide specific improved computer functionality that improves such tournament-league type comparison/selection processes by implementing a tournament-league type comparison/selection operation with variable league sizes in each league round, which in turn minimizes the number of league rounds required to accomplish the comparison/selection operation for the particular function (e.g., selecting the maximum values of the comparison for argmax, selecting the minimum values of the comparison for argmin, and the like).

Figure 3:
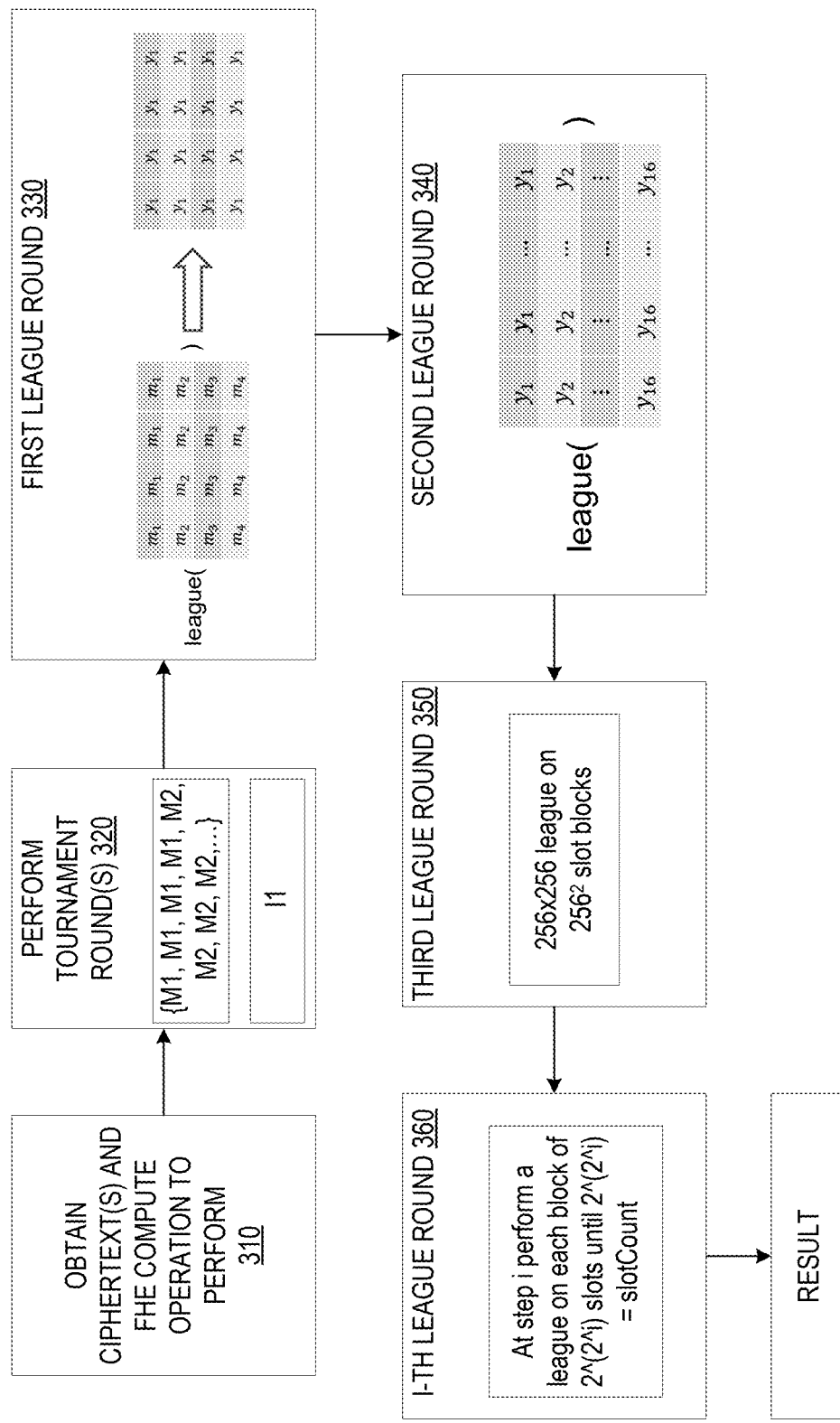
FIG. 3 is an example diagram illustrating a tournament-league type comparison/selection process for performing fully homomorphic encryption (FHE) compute operations in accordance with one illustrative embodiment.

FIG. 3 is an example diagram illustrating a tournament-league type comparison/selection process for performing FHE compute operations in accordance with one illustrative embodiment. This process may be performed by such hardware, software, or combination of hardware and software computing logic, when performing FHE compute operations, such as in the case of a cloud computing platform or other privacy preserving computer architecture in which compute operations are performed on encrypted data, i.e., ciphertexts.

For example, assume that a particular FHE compute operation requires the performance of a comparison/selection operation to accomplish the FHE compute operation, e.g., assume that the argmax of $n=2^k$ values is to be computed. With the mechanisms of the illustrative embodiments, this argmax may be computed as outlined hereafter.

As shown in FIG. 3, in a first stage of the process 310, the input ciphertext C1=Enc ($\{x_1, \ldots, x_n\}$) and the FHE compute operation to be performed is obtained, where $x_1$ to $x_n$ are the values, which are encrypted (Enc), for the input ciphertext C1, and where there are n unique values in the range [0, 1]. It should be noted that to support other ranges, one can multiply all values by a proper scale that brings the values to the range [0,1].

The first stage 310 may involve receiving the ciphertext C1 as an input data structure as part of an instruction or call to the FHE compute operation of an FHE library, engine, system, or the like. Having received the ciphertext and the requested FHE compute operation to be performed, e.g., argmax (C1), a predetermined number of tournament rounds of comparison/selection are performed 320, e.g., 2 tournament rounds, in order to reduce the number of values operated on by the league rounds to $2^{(k-2)}$ values, where k is log(s), or the log of the number of slots in the ciphertexts, and because in the examples of the present description it is assumed that the number of input values, n, is equal to the number of slots, k may also be equal to log(n). For example, the 2 tournament rounds will reduce the number of values to n/4 values, with the tournament result being duplicated amount each block of 4 slots in the results vector/matrix, e.g., a vector of results of the type $\{m_1, m_1, m_1, m_1, m_2, m_2, m_2, m_2, \ldots\}$, where "m" is the maximum/minimum value depending on whether the operation is an argmax or argmin operation, for example.

Thus, for example, using the above input ciphertext C1, the result of the tournament rounds contains $2^{(k-2)}$ values, each of which is a maximum of four consecutive slots. Using masks, additions and rotations, each of these $2^{(k-2)}$ values is duplicated on four slots, thus getting a ciphertext that looks as follows: C1=$\{m_1, m_1, m_1, m_1, m_2, m_2, m_2, m_2, \ldots, m\_(2^{(k-2)}), m\_(2^{(k-2)}), m\_(2^{(k-2)}), m\_(2^{(k-2)})\}$, where $m_1$=max ($x_1, x_2, \ldots, x_4$), $m_2$=max ($x_5, \ldots, x_8$), etc. It should be appreciated that the variable "x" stands for the original input, while "m" stands for the result of the two tournament rounds, which is also the input to the first league round, whereas "y" stands for the output of the first league round, which is also the input to the second league round. The results of the tournament rounds, i.e., $m_1, m_2, m_3, m_4$, etc., are written back to C1 which is then input to the league rounds. Further, the results of the two tournament rounds contains an indicator vector I1. The j-th slot of I1 is 1 if $x_j$ was the maximum in its 4-slot block, and is 0 otherwise. For example, if $x_1$=max ($x_1, \ldots, x_4$) and $x_6$=max ($x_5, \ldots, x_8$), then the first and sixth values of I1 will be 1.

Thereafter, a first league round of comparisons/selections is executed 330 on blocks of the tournament round results using SIMD operations. The blocks have a size, referred to as the league size, which is set to a value corresponding to the number of redundant slots, e.g., 4 in the above case. Recall that the values of C1 are duplicated four times each after the tournament rounds. For ease of explanation, each 16 consecutive slots of the ciphertext C1 are considered to be representing a 4×4 matrix. For example, the first 16 slots are shown in FIG. 3 as the matrix:

| Ciphertext C1 from Tournament Rounds | | | |
|---|---|---|---|
| $m_1$ | $m_1$ | $m_1$ | $m_1$ |
| $m_2$ | $m_2$ | $m_2$ | $m_2$ |
| $m_3$ | $m_3$ | $m_3$ | $m_3$ |
| $m_4$ | $m_4$ | $m_4$ | $m_4$ |

The ciphertext C1 that is input to the league rounds contains $2^{(k-4)}$ such 4×4 matrices.

Thus, in accordance with some illustrative embodiments, a 4×4 league round is executed on each block of 16 slots and the resulting value, e.g., y1=max ($m_1, m_2, m_3, m_4$) is then duplicated, as shown in FIG. 3. This first league round computes a ciphertext $C1_t$ which represents the transpose of the 4×4 matrices of C1. This can be done by masking, additions and rotations. For example, the first 16 slots of $C1_t$ would look as follows:

| $C1_t$: Transpose of ciphertext C1 | | | |
|---|---|---|---|
| $m_1$ | $m_2$ | $m_3$ | $m_4$ |
| $m_1$ | $m_2$ | $m_3$ | $m_4$ |
| $m_1$ | $m_2$ | $m_3$ | $m_4$ |
| $m_1$ | $m_2$ | $m_4$ | $m_4$ |

An eps, e.g., eps=0.1, is added to the main diagonal of the matrices in C1 and the results are stored in $C1_{eps}$, where again the "eps" is a small value that is added to the main diagonal to make sure that when evaluating the IsGreater operation, a "1" is obtained in the main diagonal which contains values that are equal in the matrix and the transpose of the matrix. A comparison of the ciphertexts $C1_{eps}$ and $C1_t$ is performed, e.g., compRes=isGreater ($C1_{eps}, C1_t$). As a result, the first 16 slots of the result of this comparison in the first league round will be as follows:

| Results of Comparing $C1_{eps}$ with $C1_t$ | | | |
|---|---|---|---|
| 1 | $m_1 > ?m_2$ | $m_1 > ?m_3$ | $m_1 > ?m_4$ |
| $m_2 > ?m_1$ | 1 | $m_2 > ?m_3$ | $m_2 > ?m_4$ |
| $m_3 > ?m_1$ | $m_3 > ?m_2$ | 1 | $m_3 > ?m_4$ |
| $m_4 > ?m_1$ | $m_4 > ?m_2$ | $m_4 > ?m_3$ | 1 | where ($m_i > ?m_j$) is 1 if $m_i > m_j$ and is 0 otherwise.

The columns of each 4×4 matrix of compRes are multiplied and the result is stored in the first column of each matrix. This can be done by rotate and multiply operations After the product, the first column of the i-th matrix in compRes contains the argmax of $m_i, m_{i+1}, m_{i+2}, m_{i+3}$. For example, if $m_2$ is the maximum of ($m_1, m_2, m_3, m_4$), then the first column of the first matrix will be equal to (0, 1, 0, 0). The result of this operation is stored in the ciphertext which is denoted by the indicator matrix I2.

The first column of each 4×4 matrix of I2 is duplicated four times, thus obtaining 4×4 matrices having four duplications of the argmax column. This duplication may be done by masking, multiplication and rotation operations.

A second ciphertext C2 is then computed as the product of the first ciphertext C1 and the matrix I2 having the duplications of the argmax column. For each 4×4 matrix of C1, the multiplication with I2 zeroes out the rows that are not equal to the max of the 4 values in the 4×4 matrix. For example, considering that $y_2$ is the maximum of ($m_1, m_2, m_3, m_4$), then the first 4×4 matrix of C2*I2 will look as follows:

| Result of C2*I2 | | | |
|---|---|---|---|
| 0 | 0 | 0 | 0 |
| $m_2$ | $m_2$ | $m_2$ | $m_2$ |
| 0 | 0 | 0 | 0 |
| 0 | 0 | 0 | 0 |

Thereafter, the rows of the matrices of C2 are summed and the sum is stored in the first row of each matrix. Thereafter masking is used to zero out the other rows, e.g., second, third, and fourth rows and a rotate and sum are used to duplicate the resulting summed rows to the entire 4×4 matrix with the result being stored in C2. Thus, for example, after this operation, and assuming again that that $y_2$ is the maximum of ($m_1$, $m_2$, $m_3$, $m_4$), the first 4×4 matrix of C2 will look like:

| First 4 × 4 matrix result of first league round | | | |
|---|---|---|---|
| $m_2$ | $m_2$ | $m_2$ | $m_2$ |
| $m_2$ | $m_2$ | $m_2$ | $m_2$ |
| $m_2$ | $m_2$ | $m_2$ | $m_2$ |
| $m_2$ | $m_2$ | $m_2$ | $m_2$ |

The maximum of the i-th matrix of C2 is denoted $y_i$, e.g., in this example $y_1 = m_2$ In this case, the result of the first league round is $2^{(k-2)/4} = 2^{(k-4)}$ values. The results of the first league round may be represented as vector output in which each of the result values is duplicated 16 times, e.g., {$y_1, \ldots, y_1$ (16 times), $y_2, \ldots, y_2$ (16 times), $\ldots$}. If the original input ciphertext C1 comprises values {$x_1, x_2, \ldots, x_n$}, then $y_1 = \max(m_1, m_2, m_3, m_4) = \max(x_1, \ldots, x_{16})$, $y_2 = \max(m_5, m_6, m_7, m_8) = \max(x_{17}, \ldots, x_{32})$, etc.

A second league round 340 is then executed on the results of the first league round. In this case, as the number of redundant slots is now 16, the second league round 340 uses a league size of 16. Thus, a 16×16 league round is executed on each block of 256=2⁸ slots and the result is again duplicated. The result is $2^{(k-8)}$ values. Thus, the ciphertext C2, generated as an intermediate result from the execution of the first league round, represents blocks of 16×16 matrices. As an example, the first 16×16 matrix of ciphertext C2 is as follows:

| First 16 × 16 matrix C2 from first league round | | | | | |
|---|---|---|---|---|---|
| $y_1$ | $y_1$ | $y_1$ | $y_1$ | $\ldots$ | $y_1$ |
| $y_2$ | $y_2$ | $y_2$ | $y_2$ | $\ldots$ | $y_2$ |
| $y_3$ | $y_3$ | $y_3$ | $y_3$ | $\ldots$ | $y_3$ |
| $y_4$ | $y_4$ | $y_4$ | $y_4$ | $\ldots$ | $y_4$ |
| $\ldots$ | $\ldots$ | $\ldots$ | $\ldots$ | $\ldots$ | $\ldots$ |
| $y_{16}$ | $y_{16}$ | $y_{16}$ | $y_{16}$ | $\ldots$ | $y_{16}$ |

Where each $z_i$ is duplicated 16 times.

A similar process to that described above is again followed for this second league round which is now operating on a league size of 16 and thus, 16×16 matrices in C2. The result is an indicator matrix I3 storing the argmax result similar to I2 above.

A third league round 350 is then executed on the results of the second league round, i.e. a third ciphertext C3 which is an intermediate result from the second league round. In this case, as the number of redundant slots is now 256, the third league round uses a league size of 256×256 on each block of $256^2 = 2^{16}$ slots.

This process of performing league rounds may continue for up to approximately log (log(n)) rounds, where n is the number of input values. In the i-th league round 360, the league round comparison/selection operations are performed on the result of the i−1 round, such that the i-th league round computes the maximum of $2^{2^i}$ values. This results in $2^{k-2^i}$ values. The indicator matrices from the above league rounds of operations may then be multiplied together to get the indicator of the final argmax/argmin operation. That is, after O(log(k))=O(log (log(n))) comparison rounds, one value 260 is obtained based on this multiplication of the indicator matrices, which is the maximum/minimum result for the argmax/argmin compute operation.

For example, assuming that the original input ciphertext comprises 32K values, after the first two tournament rounds, the number of values is reduced to 8K values, i.e., 32K/4. After the first (4×4) league round of comparisons/selection, the number of values is reduced to 2K, i.e., 8K/4. After the second (16×16) league round, the number of values is reduced to 128 values (2K/16) which is less than sqrt(s) values (181 for s=32K). Thereafter, the final, or i-th, league round (128×128), is executed resulting in a single value (note that a 128×128 matrix is used instead of 256×256 because there are only 128 values left after the second league round). Thus, in total, 5 comparison rounds are used to perform the comparison based compute operation, e.g., argmax in this example.

More generally, if the process starts from $n=s=2^k$ values in the input ciphertext C1, then the argmax requires O(log(k)) comparisons, as follows:

1. Performing two tournament rounds leaves $2^{(k-2)}$ values.
2. Performing a 4×4 league round leaves $2^{(k-4)}$ values.
3. Performing a 16×16 league round leaves $2^{(k-8)}$ values . . . and so on.
4. In the i-th step, $2^{(k-2^i)}$ values are left, and after log (k) steps, 1 value is obtained.

It has been found that this approach provides an improvement in speed of execution of the comparison based compute operation of approximately a factor ×2.3 over tournament approaches and ×1.5 over the previously described tournament-league approach.

Thus, in accordance with some illustrative embodiments, an improved combination of league and tournament techniques for performing comparison based compute operation is provided. While the previously described approach of combining league and tournament rounds of comparison/selection applies many tournament rounds and one league round at the end, these illustrative embodiments instead apply two tournament rounds which are followed by as many league rounds as necessary, until the comparison based compute operation results, e.g., argmax computation results, are obtained. This difference makes a significant improvement in the performance of the comparison based compute operations as it reduces the number of comparison rounds, and thus, overall comparisons, that need to be performed. It should be noted that while some illustrative embodiments are described with reference to specific numbers of tournament rounds and specific numbers of league rounds, the illustrative embodiments are not limited to these specific numbers of rounds. To the contrary, the same techniques as described herein can be used in general to apply T tournament rounds followed by L league rounds, where for purposes of illustration only, the present application uses T=2 and L=3 for some illustrative embodiments and T=1 and L=3 for other illustrative embodiments, but more configurations of T and L may be supported by the mechanisms of the illustrative embodiments.

As mentioned previously, additional improvements may be provided in some illustrative embodiments, to even further reduce the number of comparison rounds required to perform a comparison based compute operation. That is, while in the above description of league rounds, the argmax of n values $\{x_1, \ldots, x_n\}$ is computed by comparing all possible $n^2$ pairs $(x_i, x_j)$, in further illustrative embodiments, it is recognized that additional performance improvements can be achieved by sufficing with comparisons of the kind $(x_i, x_j)$ where $i<j$. This reduces the number of pairs that need to be compared from $n^2$ to $n*(n-1)/2$. This distinction may be utilized to speed-up the comparison based compute operation, e.g., the argmax computation process, by applying league rounds on larger sets of values, which reduces the total number of comparison rounds needed. For example, Instead of applying two tournament rounds at the beginning, the illustrative embodiments may be modified to apply one tournament round and then proceed with league rounds, as discussed hereafter.

Recall that after applying one tournament round the maximum of each two consecutive slots is obtained, duplicated among these two slots. Thus, each block of 10 consecutive slots holds 5 different values. In this further illustrative embodiment, the comparison based compute operation, e.g., the argmax, of 5 values may be computed using $5*4/2=10$ comparisons, a block of 10 consecutive slots is exactly enough to compute the operation, e.g., argmax, of 5 values. Assuming the first 10 output slots of the first tournament round are: $\{a_1, a_1, a_2, a_2, \ldots, a_5, a_5\}$, by using masking, rotation and addition operations, the process can obtain the following two ciphertexts: $C_1 = \{a1, a1, a1, a1, a2, a2, a2, a3, a3, a4\}$, and $C_2 = \{a2, a3, a4, a5, a3, a4, a5, a4, a5, a5\}$.

$C_1$ and $C_2$ can be thought of as the upper half triangles of the following two 5×5 matrices, respectively:

| Ciphertext $C_1$ | | | | |
|---|---|---|---|---|
| $a_1$ | $a_1$ | $a_1$ | $a_1$ | $a_1$ |
| $a_2$ | $a_2$ | $a_2$ | $a_2$ | $a_2$ |
| $a_3$ | $a_3$ | $a_3$ | $a_3$ | $a_3$ |
| $a_4$ | $a_4$ | $a_4$ | $a_4$ | $a_4$ |
| $a_5$ | $a_5$ | $a_5$ | $a_5$ | $a_5$ |

| Ciphertext $C_2$ | | | | |
|---|---|---|---|---|
| $a_1$ | $a_2$ | $a_3$ | $a_4$ | $a_5$ |
| $a_1$ | $a_2$ | $a_3$ | $a_4$ | $a_5$ |
| $a_1$ | $a_2$ | $a_3$ | $a_4$ | $a_5$ |
| $a_1$ | $a_2$ | $a_3$ | $a_4$ | $a_5$ |
| $a_1$ | $a_2$ | $a_3$ | $a_4$ | $a_5$ |

Computing isGreater ($C_1$, $C_2$) gives all of the comparisons needed to compute argmax ($a_1, \ldots, a_5$). After computing the argmax from $C_1$ and $C_2$, the maximum values are duplicated, e.g., using masking, rotations and additions, to the whole 10 block slots. More generally, by holding only the upper half triangles of the matrices used in the previously described illustrative embodiments, the improvements in these further illustrative embodiments can reduce the number of slots needed for each league round.

For example, assuming the process starts with 32K values, the argmax will proceed as follows, assuming tournament and league rounds are implemented similarly to the embodiments described above, but with different numbers of rounds and different league sizes. First, one tournament round leaves 32K/2=16K values. Then, after a first league round (with league size 5), the number of values is reduced to 16K/5=~3279 values. After this first league round, each value is duplicated among 10 slots. In order to reduce the number of comparison rounds, it is desirable to use as large a league size as possible. Following the improvement discussed here, a league of size n requires $n*(n-1)/2$ slots as discussed above. However, in the result here, each of the n values are spread on n*10 slots (because each value is duplicated 10 times). To make sure the league size fits into the slots of the output, $n*(n-1)/2<=10*n$ slots are required. The largest n that satisfies this inequality is n=21 since for this value the following equality is achieved: $21*(21-1)/2=10*21$. This means that each of 21 values cover $21*10=210$ slots. Thus, the process according to the further improved illustrative embodiments may use league size 21 (because each such league requires $21*20/2=210$ comparisons).

After a second league round with league size 21, the number of values is reduced to 3279/21=~157 values.4. After this second league round, a final league round is applied to compute the argmax of these 157 values. This requires $157*156/2=12246$ pairs of comparisons, which fits well into a 32K slot ciphertext. In total, this improvement enables the comparison based compute operation, e.g., argmax operation, to be computed on 32K values using 4 rounds, which is an improvement over the 5 comparison rounds that were required in the previously described illustrative embodiments.

Figure 4A:
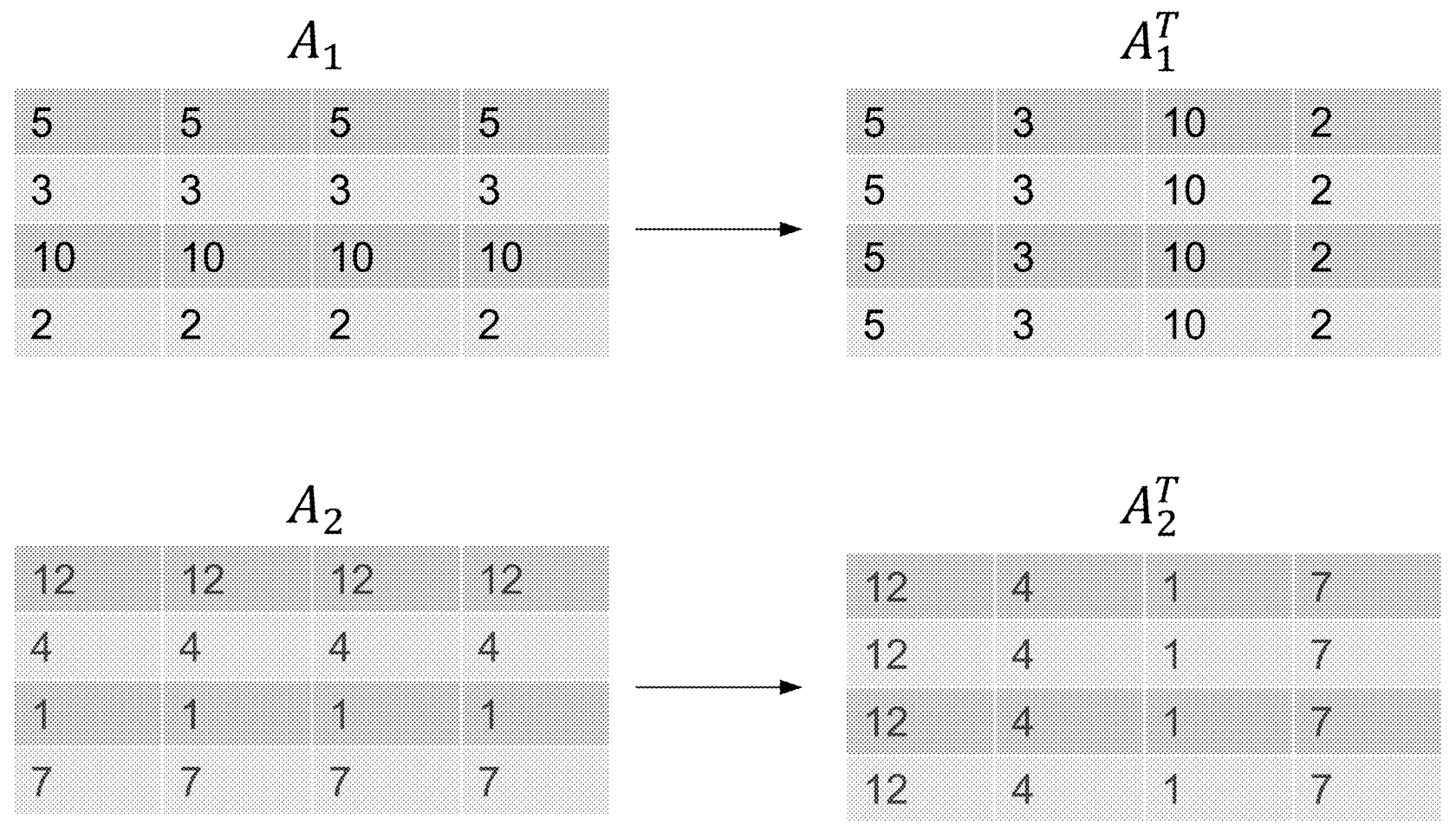
Figure 4B:
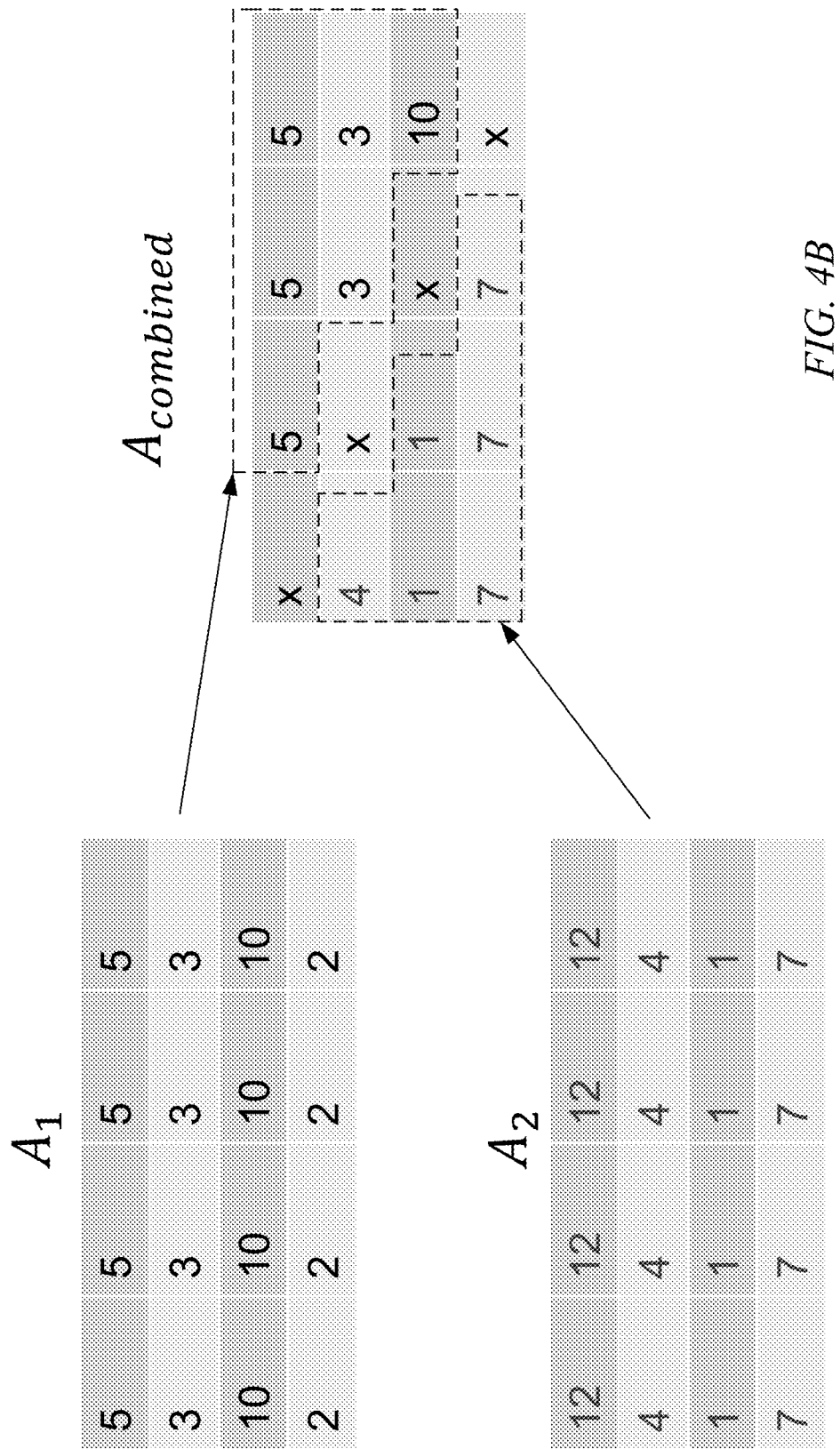

An example of the process of these further illustrative embodiments is shown in FIGS. 4A-4D. The example shown in FIGS. 4A-4D illustrates the process of using upper and lower ciphertexts as described above. For example, assume as shown in FIG. 4A, that the inputs are two ciphertexts $A_1$ and $A_2$, respectively. The transpose of these matrices are generated, i.e., $A_1^T$ and $A_2^T$. As shown in FIG. 4B, the first ciphertext $A_1$ is combined with the second ciphertext $A_2$ by taking the upper triangle of matrix $A_1$ and the lower triangle of matrix $A_2$ with the main diagonal values being set to a predetermined value, depicted as "x" in the diagram, to generate combined matrix $A_{combined}$. As shown in FIG. 4C, the transpose of the matrix $A_{combined}$ is generated, i.e., $A_{combined}^T$, where the transpose of the combined matrix $A_{combined}^T$ corresponds to the upper and lower portions of transpose matrices $A_1^T$ and $A_2^T$.

Figure 4D:
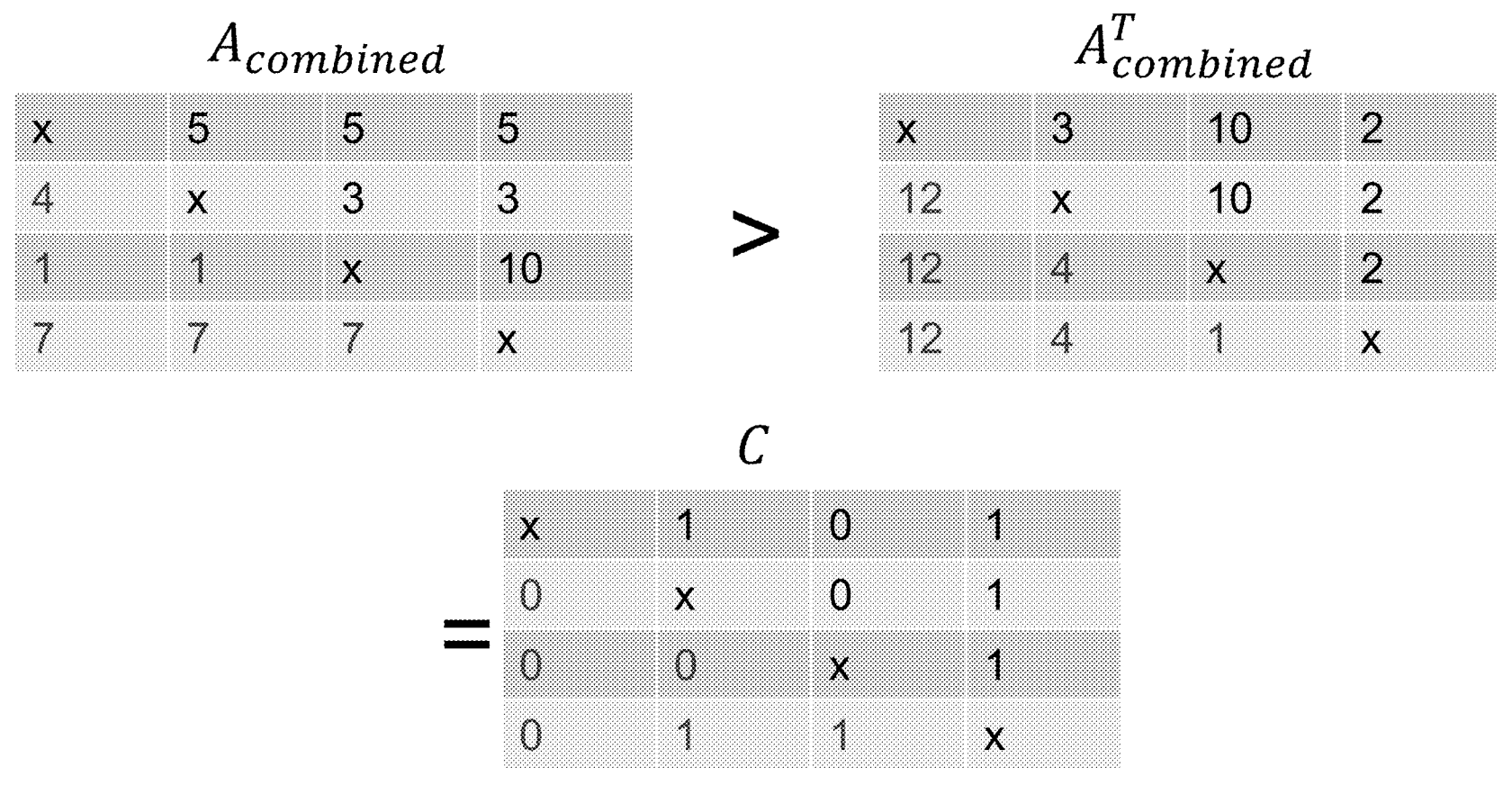

As shown in FIG. 4D, an "isGreater" comparison is performed between $A_{combined}$ and $A_{combined}^T$ to generate the indicator ciphertext C in FIG. 4D, which is an intermediate indicator result obtained after the comparison (different from I mentioned above, which is the indicator matrix resulting from the output of the league round). Thus, values in C are set to 1 or 0 depending on whether the value in $A_{combined}$ is greater than the corresponding value in $A_{combined}^T$.

Two options are present for extracting the result of the comparison based compute operation, e.g., argmax, argmin, or the like. In a first option, as shown in FIG. 5A, assuming an argmax operation, the result of the operation is achieved by calculating the product of values in the slots of the ciphertext C. The i-th element of the argmax result is computed by multiplying the slots of C that contain the comparisons of the i-th input value with another input value $j \neq i$. In case $i>j$, we use the logical not of the comparison result (where the logical not of x is define as 1−x). For example, for row 0 (top left slot is at (0,0)) the argmax of row 0 is the product of the ciphertext C value in slots (0,1), (0,2), and (0,3) as represented by $C_{0,1}$, $C_{0,2}$, and $C_{0,3}$. Similar calculations for the argmax of each row are calculated in a similar manner.

Figure 5B:
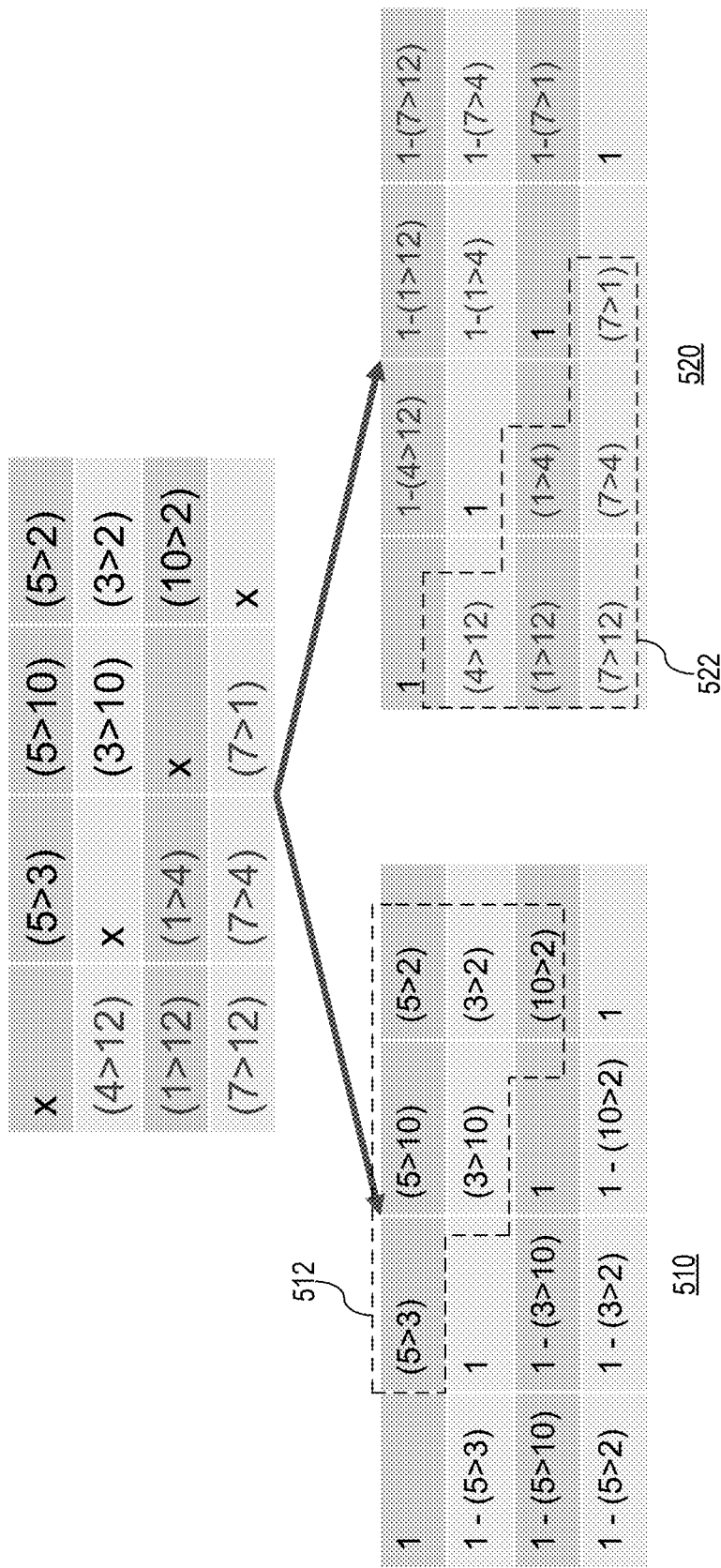

In a second option, as shown in FIG. 5B, the indicator ciphertext C may be split into two square matrices, one with the upper diagonal and the other with the lower diagonal, with these slots replicated in the other diagonal, e.g., in split ciphertext 510, the upper triangle 512 is replicated to the lower triangle and in split ciphertext 520, the lower triangle 522 is replicated to the upper triangle. The comparison based compute operation may then be evaluated in a similar manner as described above with regard to the example illustrative embodiments involving the 5 (2 tournament and 3 league) or 4 (1 tournament and 3 league) comparison rounds.

As described above, the illustrative embodiments provide an improved computing tool and improved computing tool operations/functionality that implement an improved tournament-league type comparison/selection process for performing computing operations that rely on such comparisons/selections, e.g., argmax, argmin, maximum, minimum, etc. The illustrative embodiments improve the way in which computing devices and systems perform their operations, and specifically operations that involve a tournament-league type comparison/selection process and make such operations more efficient in terms of speed and resource utilization.

For example, assume a client has sensitive data on which they want to train a machine learning model, e.g., an XGBoost model or the like. The data contains several samples (e.g., s1, s2, ..., s1000) and each sample contains several features (e.g., 10 features). These features can be represented, for example, by real numbers.

The client wants to utilize cloud services and/or infrastructure to assist with this machine learning training of the machine learning model. In order to do so, the client encrypts their sensitive data using FHE and sends it to the cloud services/infrastructure provider. The computing systems, e.g., server(s), in the cloud start the machine learning model training process on the received encrypted data.

Using XGBoost as one, non-limiting example, with the XGBoost training process, the server builds binary tree objects that consist of nodes. Each such node contains a comparison condition "f<t", where "f" specifies an index of one of the features of the dataset and "t" is a value computed by the training algorithm. A possible method to compute the required feature, "f" and the required threshold "t", starts by evaluating several candidates (e.g. f1<t1, f2<t2, f3<t3, ... ) and assigning a score to each candidate. Because the dataset is encrypted, the computed scores of the candidates are encrypted as well. To choose the best candidate, the server performs an argmax operation on the encrypted candidate scores.

In accordance with one or more of the above illustrative embodiments, the comparisons/selections that are required in order to execute the argmax operation are performed using one or more of the tournament-league processes described above. Thus, the mechanisms of the illustrative embodiments operate to improve the performance, e.g., speed and resource utilization, of the argmax operation in this machine learning training process. This is just one example of an application of the mechanisms of the illustrative embodiments and many others may also be improved by the implementation of one or more of the illustrative embodiments.

The present invention may be a specifically configured computing system, configured with hardware and/or software that is itself specifically configured to implement the particular mechanisms and functionality described herein, a method implemented by the specifically configured computing system, and/or a computer program product comprising software logic that is loaded into a computing system to specifically configure the computing system to implement the mechanisms and functionality described herein. Whether recited as a system, method, of computer program product, it should be appreciated that the illustrative embodiments described herein are specifically directed to an improved computing tool and the methodology implemented by this improved computing tool.

In particular, the improved computing tool of the illustrative embodiments specifically provides fully homomorphic encryption enabled tournament-league type comparison/selection operations to be performed within a computing device as part of functions that can be performed using such tournament-league type comparison/selection operations, e.g., argmax, argmin, maximum, minimum, etc. The improved computing tool implements mechanism and functionality which are specifically directed to improving the way in which computing devices and systems perform their operations, and specifically operations that involve a tournament-league type comparison/selection process. The improvements provided by the mechanisms of the illustrative embodiments cannot be practically performed by human beings either outside of, or with the assistance of, a technical environment, such as a mental process or the like. The improved computing tool provides a practical application of the methodology at least in that the improved computing tool is able to more efficiently, i.e., with lower performance cost, perform functions that involve tournament-league type comparison/selection processes on vector data structures, such as ciphertext data structures where multiple encrypted values are packed into a single ciphertext, or between two or more different ciphertexts.

As noted above, the illustrative embodiments are especially well suited to computing environments in which privacy of data is maintained by using ciphertext data structures. An example of such a computing environment is one in which the fully homomorphic encryption enabled operations, such as graph embedding operations, machine learning training operations, and the like, are provided as a cloud service to clients and/or when the machine learning computer models are provided as a cloud service with instances of such machine learning computer models being trained using client data at a server side and results are returned to the client. In such cases, the client data may be encrypted as ciphertext data structures which are provided to the service or remote cloud computing system which performs analytics on the ciphertext data structure or other computer operations involving operations/functions that involve a tournament-league type comparison/selection process to return results of those operations/functions. With the mechanisms of the illustrative embodiments, such operations/functions may be performed on the encoded and encrypted client data and thereby avoid exposure of private data, while achieving improved performance by implementing tournament-league type comparison/selection process mechanisms in accordance with one or more of the above illustrative embodiments.

Figure 6:
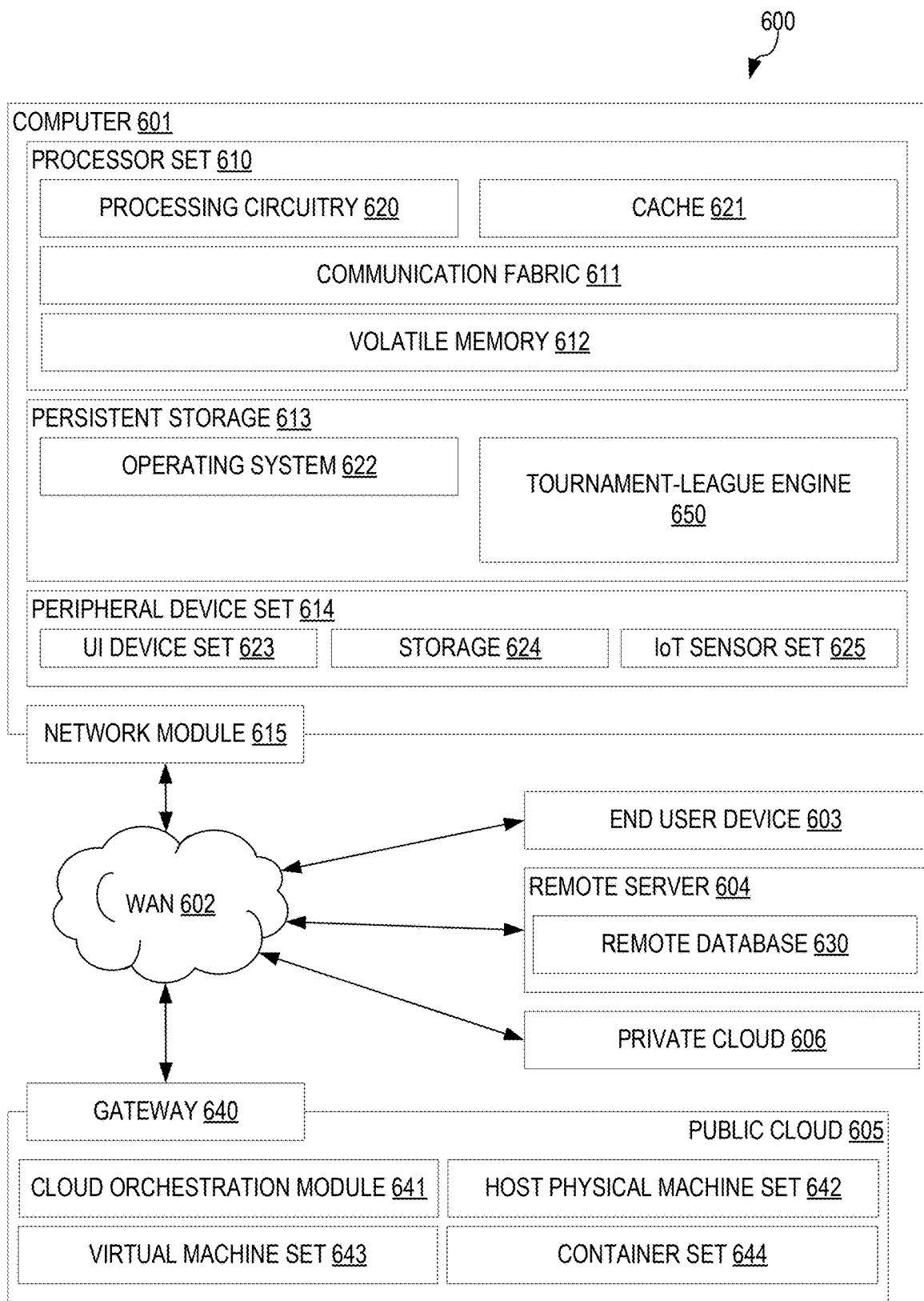
FIG. 6 is an example diagram of a distributed data processing system environment in which aspects of the illustrative embodiments may be implemented and at least some of the computer code involved in performing the inventive methods may be executed.

FIG. 6 is an example diagram of a distributed computing environment in which aspects of the illustrative embodiments may be implemented. As shown in FIG. 6, the computing environment 600 contains an example of an environment for the execution of at least some of the computer code involved in performing the inventive methods, such as the tournament-league engine 650. That is, the tournament-league engine 650 may implement computer logic executed to perform the methods of the illustrative embodiments, such as those using the 4 or 5 comparison rounds noted above, in order to perform comparison based compute operations, such as on FHE ciphertexts or the like. In some illustrative embodiments, the computer executed logic may be provided as algorithms in a library or other data structures having instructions executed by processors of the computing device and which may be invoked by other algorithms executing in the computing device by referencing the function in the library.

In addition to tournament-league engine 650, computing environment 600 includes, for example, computer 601, wide area network (WAN) 602, end user device (EUD) 603, remote server 604, public cloud 605, and private cloud 606. In this embodiment, computer 601 includes processor set 610 (including processing circuitry 620 and cache 621), communication fabric 611, volatile memory 612, persistent storage 613 (including operating system 622 and tournament-league engine 650, as identified above), peripheral device set 614 (including user interface (UI), device set 623, storage 624, and Internet of Things (IoT) sensor set 625), and network module 615. Remote server 604 includes remote database 630. Public cloud 605 includes gateway 640, cloud orchestration module 641, host physical machine set 642, virtual machine set 643, and container set 644.

Computer 601 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 630. As is well understood in the art of computer technology, and depending upon the technology, performance of a computer-implemented method may be distributed among multiple computers and/or between multiple locations. On the other hand, in this presentation of computing environment 600, detailed discussion is focused on a single computer, specifically computer 601, to keep the presentation as simple as possible. Computer 601 may be located in a cloud, even though it is not shown in a cloud in FIG. 6. On the other hand, computer 601 is not required to be in a cloud except to any extent as may be affirmatively indicated.

Processor set 610 includes one, or more, computer processors of any type now known or to be developed in the future. Processing circuitry 620 may be distributed over multiple packages, for example, multiple, coordinated integrated circuit chips. Processing circuitry 620 may implement multiple processor threads and/or multiple processor cores. Cache 621 is memory that is located in the processor chip package(s) and is typically used for data or code that should be available for rapid access by the threads or cores running on processor set 610. Cache memories are typically organized into multiple levels depending upon relative proximity to the processing circuitry. Alternatively, some, or all, of the cache for the processor set may be located "off chip." In some computing environments, processor set 610 may be designed for working with qubits and performing quantum computing.

Computer readable program instructions are typically loaded onto computer 601 to cause a series of operational steps to be performed by processor set 610 of computer 601 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 621 and the other storage media discussed below. The program instructions, and associated data, are accessed by processor set 610 to control and direct performance of the inventive methods. In computing environment 600, at least some of the instructions for performing the inventive methods may be stored in tournament-league engine 650 in persistent storage 613.

Communication fabric 611 is the signal conduction paths that allow the various components of computer 601 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 612 is any type of volatile memory now known or to be developed in the future. Examples include dynamic type random access memory (RAM) or static type RAM. Typically, the volatile memory is characterized by random access, but this is not required unless affirmatively indicated. In computer 601, the volatile memory 612 is located in a single package and is internal to computer 601, but, alternatively or additionally, the volatile memory may be distributed over multiple packages and/or located externally with respect to computer 601.

Persistent storage 613 is any form of non-volatile storage for computers that is now known or to be developed in the future. The non-volatility of this storage means that the stored data is maintained regardless of whether power is being supplied to computer 601 and/or directly to persistent storage 613. Persistent storage 613 may be a read only memory (ROM), but typically at least a portion of the persistent storage allows writing of data, deletion of data and re-writing of data. Some familiar forms of persistent storage include magnetic disks and solid state storage devices. Operating system 622 may take several forms, such as various known proprietary operating systems or open source Portable Operating System Interface type operating systems that employ a kernel. The code included in tournament-league engine 650 typically includes at least some of the computer code involved in performing the inventive methods.

Peripheral device set 614 includes the set of peripheral devices of computer 601. Data communication connections between the peripheral devices and the other components of computer 601 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 623 may include components such as a display screen, speaker, microphone, wearable devices (such as goggles and smart watches), keyboard, mouse, printer, touchpad, game controllers, and haptic devices. Storage 624 is external storage, such as an external hard drive, or insertable storage, such as an SD card. Storage 624 may be persistent and/or volatile. In some embodiments, storage 624 may take the form of a quantum computing storage device for storing data in the form of qubits. In embodiments where computer 601 is required to have a large amount of storage (for example, where computer 601 locally stores and manages a large database) then this storage may be provided by peripheral storage devices designed for storing very large amounts of data, such as a storage area network (SAN) that is shared by multiple, geographically distributed computers. IoT sensor set 625 is made up of sensors that can be used in Internet of Things applications. For example, one sensor may be a thermometer and another sensor may be a motion detector.

Network module 615 is the collection of computer software, hardware, and firmware that allows computer 601 to communicate with other computers through WAN 602. Network module 615 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 615 are performed on the same physical hardware device. In other embodiments (for example, embodiments that utilize software-defined networking (SDN)), the control functions and the forwarding functions of network module 615 are performed on physically separate devices, such that the control functions manage several different network hardware devices. Computer readable program instructions for performing the inventive methods can typically be downloaded to computer 601 from an external computer or external storage device through a network adapter card or network interface included in network module 615.

WAN 602 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 603 is any computer system that is used and controlled by an end user (for example, a customer of an enterprise that operates computer 601), and may take any of the forms discussed above in connection with computer 601. EUD 603 typically receives helpful and useful data from the operations of computer 601. For example, in a hypothetical case where computer 601 is designed to provide a recommendation to an end user, this recommendation would typically be communicated from network module 615 of computer 601 through WAN 602 to EUD 603. In this way, EUD 603 can display, or otherwise present, the recommendation to an end user. In some embodiments, EUD 603 may be a client device, such as thin client, heavy client, mainframe computer, desktop computer and so on.

Remote server 604 is any computer system that serves at least some data and/or functionality to computer 601. Remote server 604 may be controlled and used by the same entity that operates computer 601. Remote server 604 represents the machine(s) that collect and store helpful and useful data for use by other computers, such as computer 601. For example, in a hypothetical case where computer 601 is designed and programmed to provide a recommendation based on historical data, then this historical data may be provided to computer 601 from remote database 630 of remote server 604.

Public cloud 605 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 605 is performed by the computer hardware and/or software of cloud orchestration module 641. The computing resources provided by public cloud 605 are typically implemented by virtual computing environments that run on various computers making up the computers of host physical machine set 642, which is the universe of physical computers in and/or available to public cloud 605. The virtual computing environments (VCEs) typically take the form of virtual machines from virtual machine set 643 and/or containers from container set 644. It is understood that these VCEs may be stored as images and may be transferred among and between the various physical machine hosts, either as images or after instantiation of the VCE. Cloud orchestration module 641 manages the transfer and storage of images, deploys new instantiations of VCEs and manages active instantiations of VCE deployments. Gateway 640 is the collection of computer software, hardware, and firmware that allows public cloud 605 to communicate through WAN 602.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 606 is similar to public cloud 605, except that the computing resources are only available for use by a single enterprise. While private cloud 606 is depicted as being in communication with WAN 602, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 605 and private cloud 606 are both part of a larger hybrid cloud.

As shown in FIG. 6, one or more of the computing devices, e.g., computer 601 or remote server 604, may be specifically configured to implement a fully homomorphic encryption enabled graph embedding engine, cloud service, or the like, in accordance with one or more illustrative embodiments. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as computing device 601 or remote server 604, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described herein, the implementation of the mechanisms of the illustrative embodiments improves the functionality of the computing device and provides a useful and concrete result that facilitates the performance of tournament-league type comparison/selection processes for executing comparison based compute operations on vector data structures, such as ciphertext data structures or the like.

Figure 7:
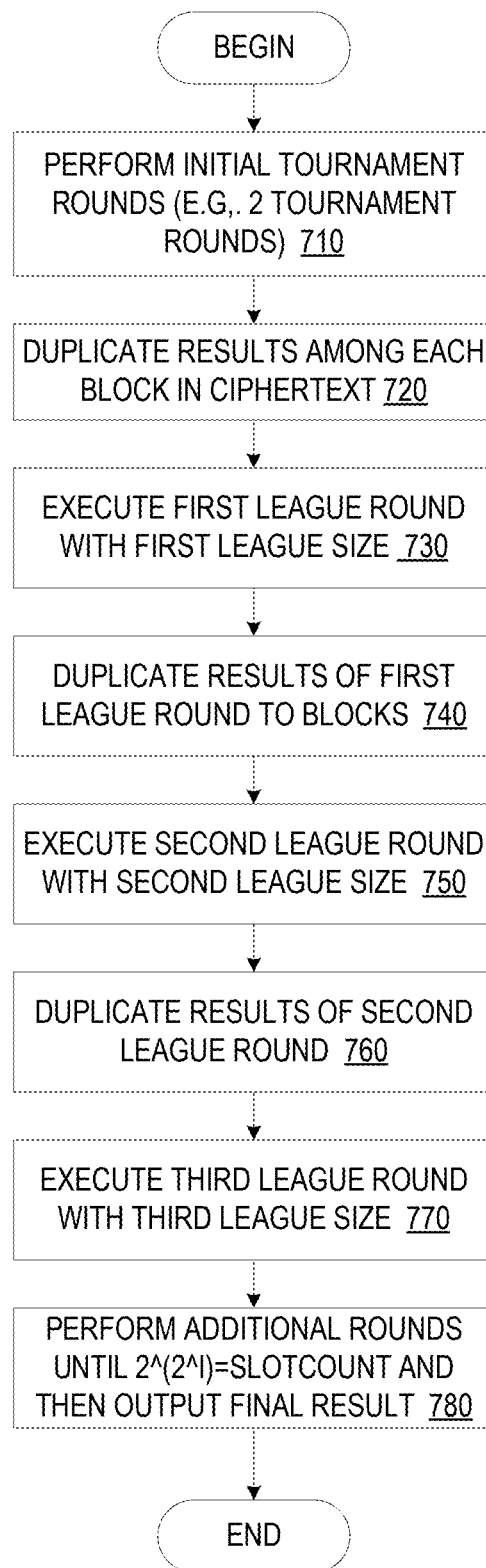
FIG. 7 is a flowchart outlining an example operation of a tournament-league comparison/selection engine in accordance with one illustrative embodiment.
Figure 8:
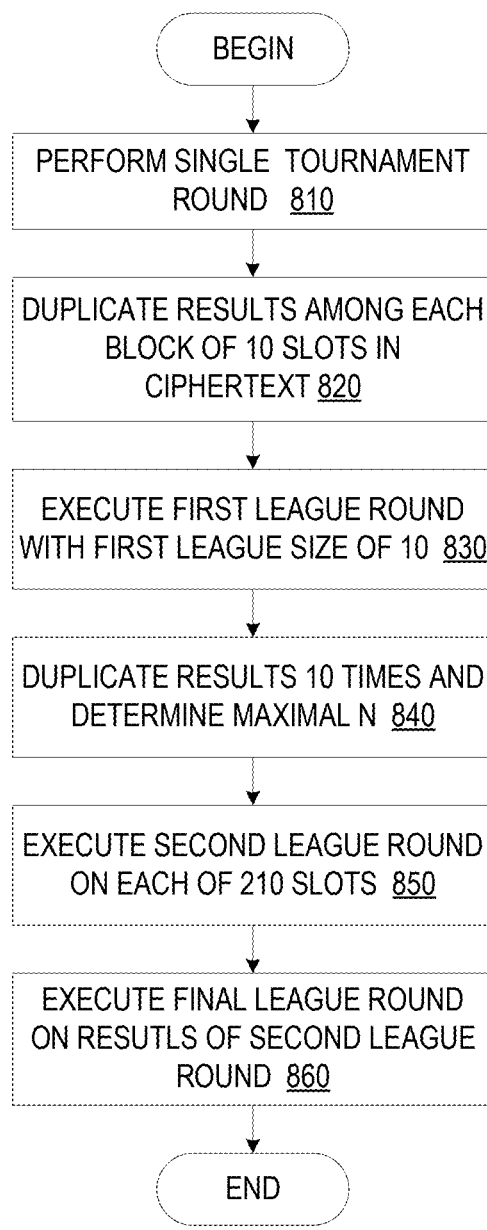
FIG. 8 is a flowchart outlining an example operation of a tournament-league comparison/selection engine in accordance with another illustrative embodiment.

FIGS. 7-8 present flowcharts outlining example operations of elements of the present invention with regard to one or more illustrative embodiments. It should be appreciated that the operations outlined in FIGS. 7-8 are specifically performed automatically by an improved computer tool of the illustrative embodiments and are not intended to be, and cannot practically be, performed by human beings either as mental processes or by organizing human activity. To the contrary, the operations in FIGS. 7-8 themselves are specifically performed by the improved computing tool in an automated manner, and in particular with regard to specific computer operations or functions whose results may be generated by performing a tournament-league type comparison/selection operation, which is specifically improved by the mechanisms of the illustrative embodiments.

FIG. 7 is a flowchart outlining an example operation of a tournament-league comparison/selection engine in accordance with one illustrative embodiment. The operation outlined in FIG. 7 may be performed for example, by a tournament-league engine 650 in FIG. 6, and may be invoked as a result of a call to a tournament-league comparison operation, which may be part of a larger operation. For purposes of the example, it will be assumed that the tournament-league comparison operation is used to generate the argmax of an input ciphertext, but as noted above, can be adapted easily to other comparison based compute operations, such as argmin, in view of the present description.

As shown in FIG. 7, the operation starts by performing two tournament rounds of comparisons in accordance with the tournament round operation described above with regard to FIG. 1, for example (step 710). This results in a reduction in values in the input ciphertext from n values to n/4 values. The results of these tournament rounds are duplicated among each block of X slots in the ciphertext (step 720), where in the depicted example, X is set to 4 since the tournament rounds reduce the number of values to ¼ of the original number of values. A first league round is executed with a first league size (step 730). The first league size, for example, may be set to 4 since the values are replicated in blocks of 4 slots. Thus, the first league round operates using 4×4 leagues on each block of 16 slots. The results of the first league round are duplicated to the 16×16 blocks (step 740).

A second league round is then executed with a league size 16 and thus, operates using 16×16 leagues on blocks of 256 slots (step 750). Again, the results are duplicated to the 256 slots (step 760). A third league round is then executed with a league size of 256 such that the operation operates using 256×256 leagues on each block of $256^2$ slots (step 770). Additional league rounds i may be executed on each block of $2^{2^i}$ slots until reaching $2^{2^i}$=slotCount at which point a single value for the comparison based compute operation is output (step 780). The operation then terminates.

FIG. 8 is a flowchart outlining an example operation of a tournament-league comparison/selection engine in accordance with another illustrative embodiment. The operation outlined in FIG. 8 may be performed for example, by a tournament-league engine 650 in FIG. 6, and may be invoked as a result of a call to a tournament-league comparison operation, which may be part of a larger operation. For purposes of the example, it will be assumed that the tournament-league comparison operation is used to generate the argmax of an input ciphertext, but as noted above, can be adapted easily to other comparison based compute operations, such as argmin, in view of the present description.

As shown in FIG. 8, the operation starts by performing a single tournament round of comparisons in accordance with the tournament round operation described above with regard to FIG. 1, for example (step 810). This results in a reduction in values in the input ciphertext from n values to n/2 values. The results of the tournament round are duplicated among each block of 10 slots in the ciphertext such that each block of 10 slots holds 5 values (step 820). A league operation is performed with league size 10, which reduces the values by $\frac{1}{5}^{th}$ (step 830), e.g., reducing the number of values from 32K originally, to 16K after the tournament round, to approximately 3279 values after the first league round. The result of the first league round with league size 10 is that values are duplicated 10 times and the maximal n is determined such that n*(n−1)/2<=n*10 (step 840). In the depicted example, this results in 210 slots holding 21 values. A second league round operation is thus, performed on each of 210 slots, which hold 21 values (step 850). This reduces the number of values by approximately 1/21, e.g., reducing the previous approximately 3279 values to approximately 157 values. A final league round is executed on the resulting values from the second league round to generate a final output value for the comparison based compute operation (step 860). The operation then terminates.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for performing a tournament-league comparison process of a computer function, the method comprising:
   receiving a request to execute the computer function on at least one input vector data structure, wherein a result of the computer function is provided by executing a tournament-league comparison process, and wherein the at least one input vector data structure comprises a plurality of values, each value corresponding to a vector slot of the at least one input vector data structure;
   executing at least one iteration of a tournament comparison operation to generate a first intermediate ciphertext and indicator matrix, wherein the first intermediate ciphertext comprises fewer vector slots than the at least one input vector data structure;
   executing a plurality of iterations of a league comparison operation based on the first intermediate ciphertext and one or more second intermediate ciphertexts generated at each iteration of the league comparison operation;
   executing a final iteration of the league comparison operation that outputs a final result of the tournament-league comparison process; and
   performing the requested computer function based on the result of the tournament-league comparison process,
   wherein the plurality of iterations of the league comparison process comprises generating a combined matrix from a first matrix of a first input vector data structure of the at least one input vector data structure, and a second matrix of a second input vector data structure of the at least one input vector data structure, wherein the combined matrix comprises an upper triangle of the first matrix and a lower triangle of the second matrix.

2. The method of claim 1, wherein the input vector data structure is a single ciphertext data structure, and wherein executing the at least one iteration of the tournament comparison process comprises performing local selection operations between pairs of slots within the single ciphertext data structure based on the requested computer function.

3. The method of claim 1, wherein the computer function is one of a max function, an argmax function, a min function, an argmin function, or a candidate selection operation in which criteria for selection is specified in the computer function.

4. The method of claim 1, wherein the at least one iteration of the tournament comparison process comprises two iterations of the tournament comparison process, and wherein the plurality of iterations of the league comparison process comprises three iterations of the league comparison process and the final iteration of the league comparison process.

5. The method of claim 1, wherein the at least one iteration of the tournament comparison process comprises a single iteration of the tournament comparison process, and wherein the plurality of iterations of the league comparison process comprises three iterations of the league comparison process and the final iteration of the league comparison process.

6. The method of claim 1, wherein each iteration of the league comparison process is executed using a different league size than other iterations of the league comparison process in the plurality of iterations of the league comparison process.

7. The method of claim 6, wherein a first league size for a first iteration of the league comparison is 4, a second league size for a second iteration of the league comparison is 16, and a third league size for a third iteration of the league comparison is 256.

8. The method of claim 1, wherein executing the plurality of iterations of the league comparison process comprises executing two iterations of the league comparison process as a single operation based on the combined matrix.

9. The method of claim 1, wherein the computer function implements a computer function in a homomorphic encrypted operation.

10. A computer program product comprising a computer readable storage medium having a computer readable program stored therein, wherein the computer readable program, when executed on a computing device, causes the computing device to:
    receive a request to execute the computer function on at least one input vector data structure, wherein a result of the computer function is provided by executing a tournament-league comparison process, and wherein the at least one input vector data structure comprises a plurality of values, each value corresponding to a vector slot of the at least one input vector data structure;
    execute at least one iteration of a tournament comparison operation to generate a first intermediate ciphertext and indicator matrix, wherein the first intermediate ciphertext comprises fewer vector slots than the at least one input vector data structure;
    execute a plurality of iterations of a league comparison operation based on the first intermediate ciphertext and one or more second intermediate ciphertexts generated at each iteration of the league comparison operation;
    execute a final iteration of the league comparison operation that outputs a final result of the tournament-league comparison process; and
    perform the requested computer function based on the result of the tournament-league comparison process,
    wherein the plurality of iterations of the league comparison process comprises generating a combined matrix from a first matrix of a first input vector data structure of the at least one input vector data structure, and a second matrix of a second input vector data structure of the at least one input vector data structure, wherein the combined matrix comprises an upper triangle of the first matrix and a lower triangle of the second matrix.

11. The computer program product of claim 10, wherein the input vector data structure is a single ciphertext data structure, and wherein executing the at least one iteration of the tournament comparison process comprises performing local selection operations between pairs of slots within the single ciphertext data structure based on the requested computer function.

12. The computer program product of claim 10, wherein the computer function is one of a max function, an argmax function, a min function, an argmin function, or a candidate selection operation in which criteria for selection is specified in the computer function.

13. The computer program product of claim 10, wherein the at least one iteration of the tournament comparison process comprises two iterations of the tournament comparison process, and wherein the plurality of iterations of the league comparison process comprises three iterations of the league comparison process and the final iteration of the league comparison process.

14. The computer program product of claim 10, wherein the at least one iteration of the tournament comparison process comprises a single iteration of the tournament comparison process, and wherein the plurality of iterations of the league comparison process comprises three iterations of the league comparison process and the final iteration of the league comparison process.

15. The computer program product of claim 10, wherein each iteration of the league comparison process is executed using a different league size than other iterations of the league comparison in the plurality of iterations of the league comparison process.

16. The computer program product of claim 15, wherein a first league size for a first iteration of the league comparison is 4, a second league size for a second iteration of the league comparison is 16, and a third league size for a third iteration of the league comparison is 256.

17. The computer program product of claim 10, wherein executing the plurality of iterations of the league comparison process comprises executing two iterations of the league comparison process as a single operation based on the combined matrix.

18. An apparatus comprising:
at least one processor; and
at least one memory coupled to the at least one processor, wherein the at least one memory comprises instructions which, when executed by the at least one processor, cause the at least one processor to:
receive a request to execute the computer function on at least one input vector data structure, wherein a result of the computer function is provided by executing a tournament-league comparison process, and wherein the at least one input vector data structure comprises a plurality of values, each value corresponding to a vector slot of the at least one input vector data structure;
execute at least one iteration of a tournament comparison operation to generate a first intermediate ciphertext and indicator matrix, wherein the first intermediate ciphertext comprises fewer vector slots than the at least one input vector data structure;
execute a plurality of iterations of a league comparison operation based on the first intermediate ciphertext and one or more second intermediate ciphertexts generated at each iteration of the league comparison operation;
execute a final iteration of the league comparison operation that outputs a final result of the tournament-league comparison process; and
perform the requested computer function based on the result of the tournament-league comparison process,
wherein the plurality of iterations of the league comparison process comprises generating a combined matrix from a first matrix of a first input vector data structure of the at least one input vector data structure, and a second matrix of a second input vector data structure of the at least one input vector data structure, wherein the combined matrix comprises an upper triangle of the first matrix and a lower triangle of the second matrix.

* * * * *